(12) United States Patent
Vanek et al.

(10) Patent No.: US 8,494,687 B2
(45) Date of Patent: Jul. 23, 2013

(54) METHOD FOR ENHANCING A THREE DIMENSIONAL IMAGE FROM A PLURALITY OF FRAMES OF FLASH LIDAR DATA

(75) Inventors: Michael D. Vanek, Poquoson, VA (US); Farzin Amzajerdian, Yorktown, VA (US); Alexander Bulyshev, Virginia Beach, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 275 days.

(21) Appl. No.: 13/166,121

(22) Filed: Jun. 22, 2011

(65) Prior Publication Data

US 2012/0033196 A1 Feb. 9, 2012

Related U.S. Application Data

(63) Continuation-in-part of application No. 13/046,030, filed on Mar. 11, 2011.

(60) Provisional application No. 61/357,224, filed on Jun. 22, 2010, provisional application No. 61/313,271, filed on Mar. 12, 2010.

(51) Int. Cl.
*G01J 3/45* (2006.01)
*G01S 17/00* (2006.01)
*G06F 19/00* (2011.01)

(52) U.S. Cl.
USPC .................................. 701/1; 701/16; 456/4.01

(58) Field of Classification Search
USPC .............. 701/1, 16, 448, 493; 356/4.01, 5.01, 356/300, 456; 342/137
See application file for complete search history.

(56) References Cited

U.S. PATENT DOCUMENTS

| 6,414,746 | B1 | 7/2002 | Stettner et al. |
| 7,359,057 | B2 | 4/2008 | Schwiesow |
| 7,361,922 | B2 | 4/2008 | Kameyama et al. |
| 8,306,672 | B2 * | 11/2012 | Nickolaou ........................ 701/1 |

OTHER PUBLICATIONS

Alexander Bulyshev, et al., "Super Resolution Image Enhancement for a Flash Lidar: Back Projection Method," SPIE Defense Symposium, Apr. 5-9, 2010.

(Continued)

*Primary Examiner* — Tan Q Nguyen
(74) *Attorney, Agent, or Firm* — Andrea Z. Warmbier; Helen M. Galus

(57) ABSTRACT

A method for enhancing a three dimensional image from frames of flash LIDAR data includes generating a first distance $R_i$ from a first detector i to a first point on a surface $S_i$. After defining a map with a mesh $\Theta$ having cells k, a first array S(k), a second array M(k), and a third array D(k) are initialized. The first array corresponds to the surface, the second array corresponds to the elevation map, and the third array D(k) receives an output for the DEM. The surface is projected onto the mesh $\Theta$, so that a second distance $R_k$ from a second point on the mesh $\Theta$ to the detector can be found. From this, a height may be calculated, which permits the generation of a digital elevation map. Also, using sequential frames of flash LIDAR data, vehicle control is possible using an offset between successive frames.

20 Claims, 21 Drawing Sheets

OTHER PUBLICATIONS

Alexander Bulyshev et al., "Computational Experiments on Super-resolution Enhancement of Flash Lidar Data," Proc. of SPIE, May 2010, vol. 7684.

A. Neumaier, "Solving Ill-Conditioned and Singular Linear Systems: A Tutorial on Regularization," SIAM Review 40, 1998, pp. 636-666.

Adam Rybaltowski, et al., "Signal-to-noise ratio in direct-detection mid-infrared Random-Modulation Continuous-Wave lidar in the presence of colored additive noise," Optics Express, Oct. 8, 2001, pp. 386-399, vol. 9, No. 8.

N. Takeuchi, et al., "Random modulation cw lidar," Applied Optics, May 1, 1983, pp. 1382-1386, vol. 22, No. 9.

Sung Cheol Park, et al., "Super-Resolution Image Reconstruction: A Technical Overview," IEEE Signal Processing Magazine, May 2003, pp. 21-36.

Sina Farsiu, et al., "Fast and Robust Multiframe Super Resolution," IEEE Transactions on Image Processing, Oct. 2004, pp. 1327-1344, vol. 13, No. 10.

S. Susan Young and Ronald G. Driggers, "Superresolution image reconstruction from a sequence of aliased imagery," Applied Optics, Jul. 20, 2006, pp. 5073-5085, vol. 45, No. 21.

G. T. Clement, et al., "Superresolution ultrasound imaging using back-projected reconstruction," J. Acoust. Soc. Am., Dec. 2005, pp. 3953-3960.

Subhasis Chaudhuri, "Super-Resolution Imaging," 2001, pp. 6-12, Kluwer Academic Publishers.

Chirold D. Epp, et al., "Autonomous Landing and Hazard Avoidance Technology (ALHAT)," IEEE Aerospace Conference, 2008, pp. 1-7.

Qingxiong Yang, et al., "Spatial-Depth Super Resolution for Range Images," IEEE Conference on Computer Vision and Pattern Recognition, 2007, pp. 1-6.

Shuowen Hu, et al., "Super-Resolution for Flash LADAR Data," Proc. of SPIE, 2009, pp. 73000B-1-73000B-12, vol. 7300.

Shuowen Hu, et al., "Super-resolution for flash ladar imagery," Applied Optics, Feb. 10, 2010, pp. 772-780, vol. 49, No. 5.

Feng-Qing Qin, et al., "Video supperresolution reconstruction based on subpixel registration and iterative back projection," Journal of Electronic Imaging, Jan.-Mar. 2009, pp. 013007-1-013007-11, vol. 18(1).

Diego F. Pierrottet, et al., "Characterization of 3-D imaging lidar for hazard avoidance and autonomous landing on the Moon," Proceedings of SPIE, 2007, pp. 1-9.

Alexander Bulyshev, et al., "Processing of 3-dimensional flash lidar terrain images generated from an airborne platform," Proc. of SPIE, 2009, pp. 732901-1-732901-9, vol. 7329.

G. Brauer, et al., "Capabilities and applications of the program to optimze simulated trajectories (POST)," NASA CR-2770, Feb. 1977, pp. 45-64.

Jody L. Davis, et al., "Advances in POST2 End-to-End Descent and Landing Simulation for the ALHAT Project," AIAA, 2008, pp. 1-14.

Gavin Rosenbush, et al., "Super-Resolution Enhancement of Flash LADAR Range Data," Proc. of SPIE, 2007, pp. 673614-1-673614-10, vol. 6736.

Bruce D. Lucas, et al., "An Iterative Image Registration Technique with an Application to Stereo Vision," Proceedings of Imaging Understanding Workshop, 1981, pp. 121-130.

Germund Dahlquist, et al., "Numerical Methods," 1974, p. 572, Prentice-Hall, Inc.

Lertrattanapanich, S. and Bose, N. K., "Latest Results on High-Resolution Reconstruction from Video Sequences," Technical Report, IEICE, DSP99140, The Institution of Electronic, Information and Communication Engineers, 1999.

\* cited by examiner

METHOD FOR ENHANCING A THREE DIMENSIONAL IMAGE FROM A PLURALITY OF FRAMES OF FLASH LIDAR DATA

CROSS-REFERENCE TO RELATED PATENT APPLICATIONS

Pursuant to 35 U.S.C. §119, the benefit of priority from U.S. Provisional Patent Application Ser. No. 61/357,224, with a filing date of Jun. 22, 2010, is claimed for this non-provisional application. This application is also a continuation-in-part of and claims priority to U.S. patent application Ser. No. 13/046,030, filed on Mar. 11, 2011, which claims priority to U.S. Provisional Patent Application Ser. No. 61/313,271, filed on Mar. 12, 2010. The contents of the foregoing applications are hereby incorporated by reference in their entireties.

STATEMENT REGARDING FEDERALLY SPONSORED RESEARCH OR DEVELOPMENT

The invention was made by employees of the United States Government and may be manufactured and used by or for the Government of the United States of America for governmental purposes without the payment of any royalties thereon or therefore.

FIELD OF THE INVENTION

The present invention concerns a method for creating a Digital Elevation Map ("DEM") from data generated by an apparatus relying on Light Detection and Ranging ("LIDAR") technology to generate the data.

DESCRIPTION OF THE RELATED ART

LIDAR is known for its ability to generate 2-dimensional ("2-D") images of geographic surface features.

In addition, flash LIDARs are able to generate, in real-time, range data that can be interpreted as a 3-dimensional ("3-D") image. Since the output from flash LIDARs includes range data, the output signals can be transformed into a corresponding DEM.

Through theoretical and simulation analysis, it has been determined that a single frame or mosaic of flash LIDAR data may not be sufficient to build a landing site DEM with acceptable spatial resolution, precision, and size.

A need, therefore, has developed for a method to provide additional enhancements, as set forth in greater detail below.

SUMMARY OF THE INVENTION

It is one aspect of the present invention to provide an image processing technique, applicable to flash LIDAR data, to enhance the flash LIDAR data, permitting the generation of a DEM of sufficient quality and resolution to enable safe and precise spacecraft landings for robotic and/or crewed lunar and planetary missions.

In another embodiment of the present invention, a super-resolution algorithm applicable to flash LIDAR range data that assists with the creation of a DEM with sufficient accuracy, precision and size is disclosed.

In yet another embodiment of the present invention, a super-resolution algorithm is disclosed which processes data generated during a series of simulation runs using a high fidelity model of flash LIDAR imaging of a high resolution synthetic lunar elevation map.

In still another embodiment of the present invention, the performance of flash LIDAR is disclosed. A flash LIDAR model was attached to a simulated spacecraft via a gimbal that pointed the LIDAR to a target landing site. For each simulation run, as the spacecraft descended to the landing site, a sequence of flash LIDAR frames was recorded and processed. Each run was provided with a different trajectory profile, with varying LIDAR look angles of the terrain.

In another embodiment of the present invention, the LIDAR frame output was processed using a super-resolution ("SR") algorithm, which forms part of the present invention. The results of the analyses show that the level of accuracy and precision of the SR generated landing site DEM, with respect to detecting hazardous terrain features and identifying safe areas, offers an improvement over results available through available techniques.

In yet another embodiment, the present invention also capitalizes upon the ability to generate an optical offset between successive frames of flash LIDAR data. The offset may be provided as input for a system that provides guidance, navigation, and control of a vehicle, such as a spacecraft. It is, therefore, an aspect of the present invention to rely on flash LIDAR data for guidance, navigation, and control of a vehicle.

In yet another embodiment, a real time identification of obstacles and measurement of collision time and trajectory profile for moving ground or air vehicles is provided. The present invention supplies 3-D images of surrounding environments and providing navigation data, unmanned or autonomous operation of ground and air vehicles.

Another embodiment of this invention is in a collision avoidance system for both manned and unmanned ground and air vehicles. By applying this invention to the Flash LIDAR data, obstacles, such as power lines, can be detected and its distance measured.

It is also an aspect of the present invention to provide real time image enhancement of flash LIDAR data.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
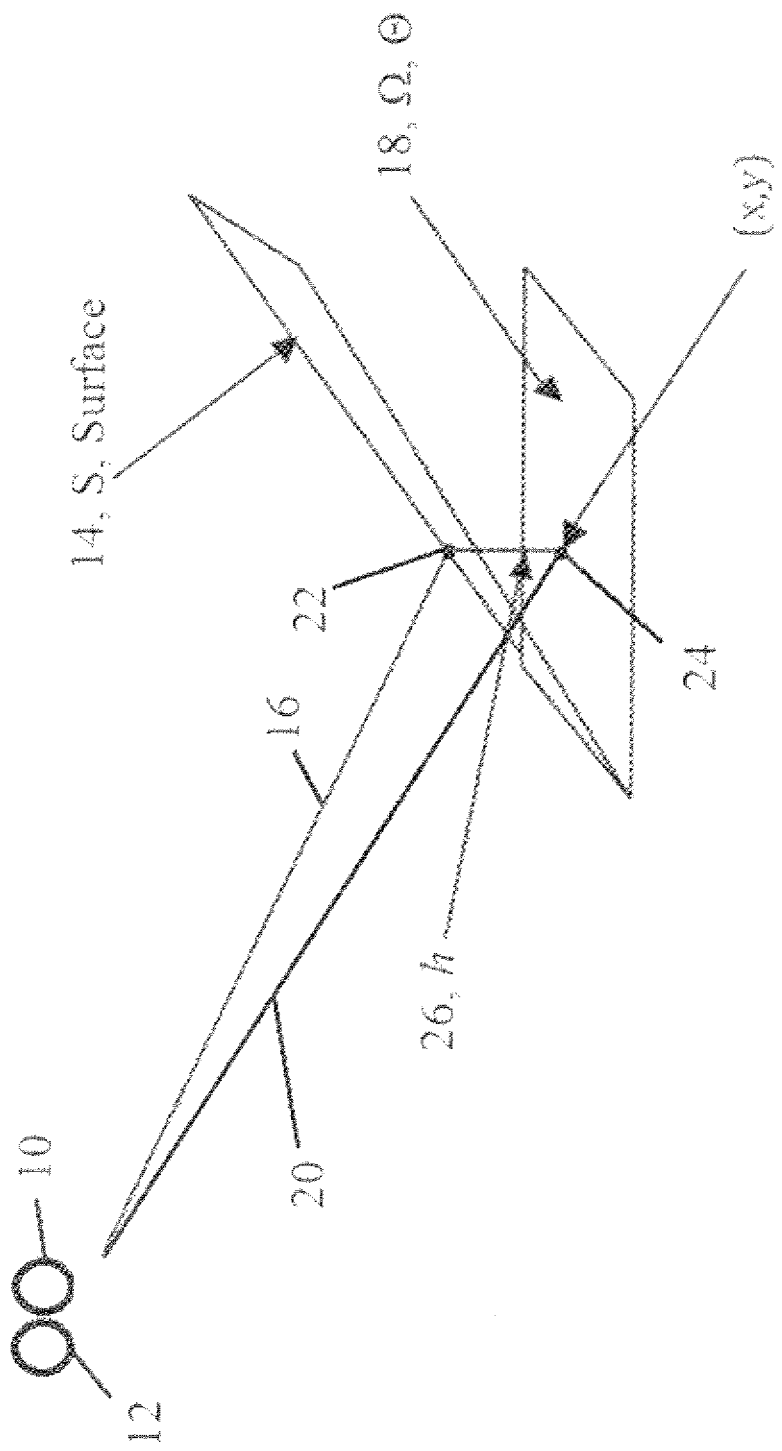
FIG. 1 is a perspective, schematic illustrating aspects of one embodiment of the present invention, illustrating a surface S to be measured by a single flash LIDAR detector pixel in the detector.

The present invention is now described in connection with the generation of DEMs for extraterrestrial landings, i.e., lunar landings and landing on other bodies within the solar system. While discussed in this context, it is noted that the invention is not limited to extraterrestrial geography but may be employed for terrestrial mapping as well. Additionally, the present invention may be employed on any device, such as a robotic arm, that is guided using flash LIDAR data. Furthermore, this invention can be employed for rendezvous and docking of spacecrafts, a spacecraft with a space station, and a spacecraft with a near-earth object such as asteroids.

In addition, the present invention is described in connection with one or more embodiments. The present invention, however, is not intended to be limited only to the embodiments described. To the contrary, those skilled in the art will readily appreciate that there are numerous equivalents and variations that may be employed consistently with the discussion of the present invention. Those equivalents and variations are intended to be encompassed by the present invention.

With respect to the present invention, the term super-resolution ("SR"), as applied to image reconstruction (rather than optical diffraction limited SR techniques), generally refers to the group of signal processing algorithms that improve the spatial resolution of an image to better than the size of the pixel of the original image. The SR techniques and algorithms of the present invention are implemented by taking advantage of sub-pixel shifts between multiple, low-resolution images of the same scene.

Historically, SR algorithms were developed for 2-D image processing.

As should be apparent to those skilled in the art, LIDAR imaging technology is capable of generating, in real-time, both 2-D intensity data and also range data. Together, the 2-D intensity data and the range data may be interpreted as a 3-D image. This dual aspect of LIDAR data underlies, at least in part, the present invention.

Through theoretical and simulation analysis, it has been determined that a single frame of flash LIDAR data may not be sufficient to build a landing site digital elevation map ("DEM") with acceptable spatial resolution, precision and size to meet current system requirements.

In addition, existing technologies are not likely to be able to construct a DEM of sufficient quality and precision within the short time window available during a landing. During the landing of a vehicle, the total time available for processing data is quite brief. Existing technologies require processing that hinders or prevents the generation of a DEM of sufficient quality during the time period for spacecraft landing The present invention recognizes that the application of SR image enhancement techniques to flash LIDAR 3-D output images permits the generation of DEM with sufficient quality in a sufficiently short period of time to be useable by a spacecraft during a landing procedure.

To the extent that flash LIDAR enhancements have been addressed, flash LIDAR images are treated as a sequence of uncorrelated images. Moreover, the 3-D character of the data has not been exploited. As noted above, the 3-D character of the data includes, among other aspects, the 2-D intensity data and the range data inherent in the LIDAR output.

The present invention encompasses an SR algorithm that is applied to flash LIDAR data, specifically the range data, permitting the creation, quickly and effectively, of a DEM with sufficient accuracy, precision and size.

As a part of the development of the algorithm(s) applying SR to LIDAR data to create a DEM, the performance of the algorithm was analyzed by generating data from a high fidelity model of a flash LIDAR system containing parameters for various sensor functions and noise sources. The flash LIDAR model was embedded in a full end-to-end landing simulation device, which was attached to a gimbal on a spacecraft model. The spacecraft model was subjected to varying trajectories while "flying" to a mock lunar landing site.

In the model, the gimbal on the spacecraft pointed the flash LIDAR to a target landing site throughout the trajectory of the spacecraft. During descent of the spacecraft, the flash LIDAR illuminated a high-resolution synthetic lunar elevation map, processed the returned laser light within the field of view of the sensor, and outputted the calculated sensor range data. The range images returned by the model were processed using the SR algorithm of the present invention and a landing site DEM was generated.

The results of the modeling showed that the achieved level of accuracy and precision of the SR generated DEM was more than adequate for detecting hazardous terrain features and identifying safe areas.

Flash LIDARs generally transmit a relatively wide divergence, pulsed laser beam that illuminates a target surface. The reflected laser light, together with any ambient light in the field of view ("FOV") of the optical sensor, is received via an optical subsystem, is detected by a focal plane array ("FPA"), is translated into electrical signals by a readout integrated circuit ("ROIC"), and is timed and processed on a per pixel basis to generate time-of-flight range measurements. These range measurements can be interpreted as a 3-D image and transformed into a corresponding DEM. The relative intensities of the returned signals are also measured and can be used to generate an intensity image.

In one example, the flash LIDAR system relies on a pulsed laser working at 1.5 micron (μm) wavelengths and a 128×128 FPA. It is noted, however, that higher power lasers, operating at more responsive wavelengths (i.e., 1.06 micron (μm)), and incorporating a larger 256×256 FPA and ROIC may be employed without departing from the scope of the present invention. In fact, it is anticipated that, as higher power systems are developed, they will be employed in future systems embodying the present invention.

Figure 17:
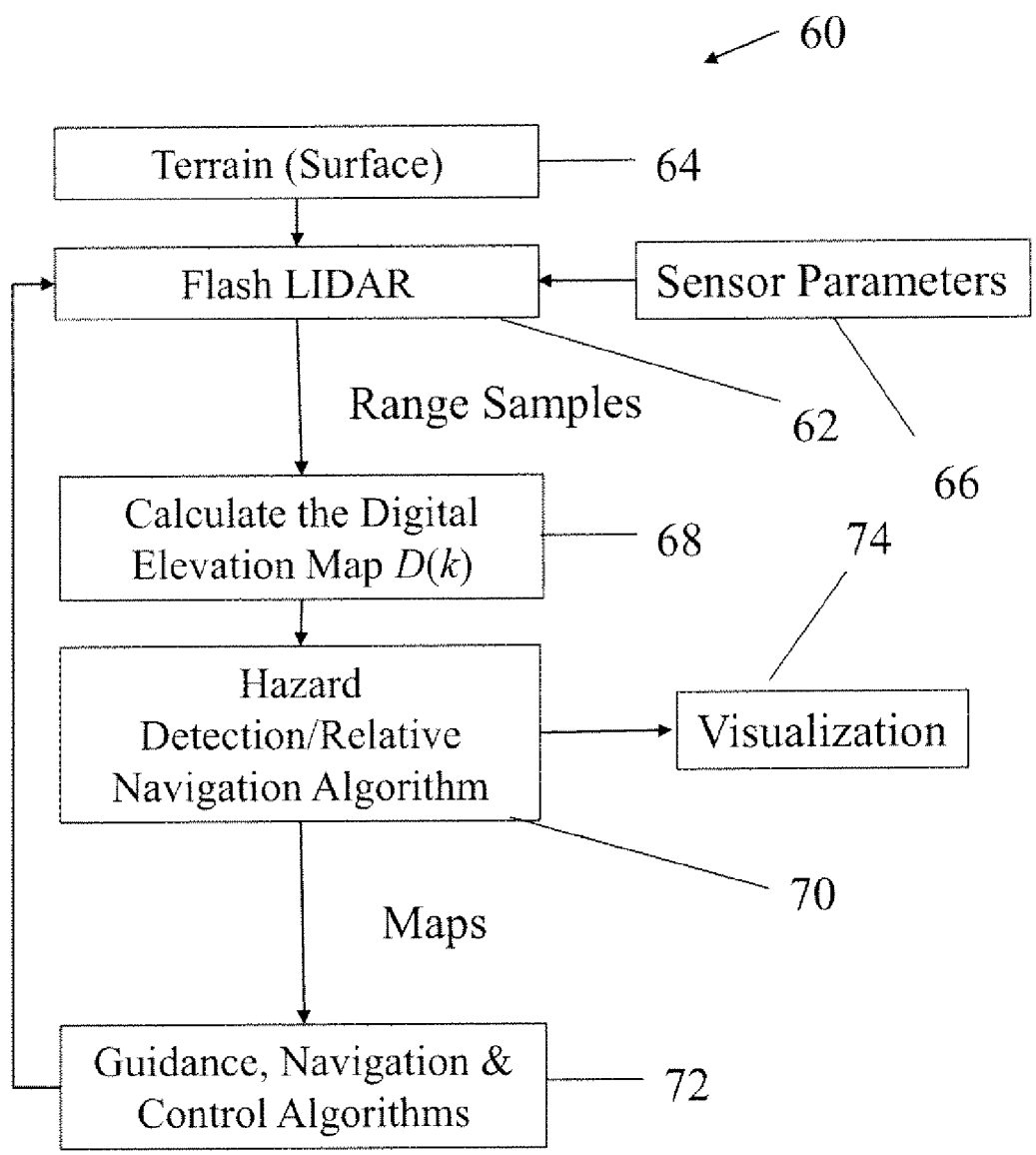
FIG. 17 provides a schematic overview of one implementation of the method depicted in FIGS. 15-16 on a vehicle, such as a spacecraft.

One embodiment of the simulation environment that illustrates the model context and interfaces of the present invention as shown in FIG. 17. The flash LIDAR model (i.e., the model spacecraft) interacts with a high resolution simulated lunar terrain via a mapping and ray trace routine. Multiple rays are assigned to each pixel within the FPA of the model. The ray-trace routine is used to interrogate the lunar terrain within the ground footprint of the sensor.

A ground footprint is generated for both the transmitter and receiver from several parameters, such as the laser beam divergence, receiver FOV, and the model's attitude and position, which are derived from the spacecraft slant range, path angle and gimbal orientation. Range and surface reflectivity data for each ray are returned to the core processing code of the model.

Based on this input information, the model implements a standard convolution imaging equation, which is set forth below as Equation (1):

$$\zeta(x,y,t) = \rho(x,y,t) \otimes \vartheta(x,y,t) + \eta(t) \quad (1)$$

In Equation (1), $\zeta$ is the output signal, $\rho$ is the point spread function that represents the LIDAR temporal pulse profile, $\vartheta$ is the object function that describes how the transmitter energy is scattered in amplitude and time, and $\eta$ is the total noise sum of various random processes such as detector dark noise, Johnson noise and shot noise. Range information is generated on a per pixel basis by signal reconstruction algorithms. The range data may be transformed into an angle-angle-range format and transferred to either a hazard detection or hazard relative navigation algorithm. These algorithms produce maps that are fed into a guidance, navigation, and control ("GNC") algorithm, which controls the motion of the spacecraft.

The flash LIDAR model includes several parameters that can be adjusted to enable simulation of a wide variety of sensor specifications. Example parameters include, but are not limited to, instantaneous field of view ("IFOV"), receiver aperture, laser power, beam divergence, and sample rate. The parameters are loaded from an i-load file into the model before a simulation run and can be adjusted to enable a Monte Carlo-type simulation.

The following steps are performed to setup and generate data to test the super-resolution algorithm of the present invention.

First, a spacecraft trajectory was generated for 90° and 45° path angles with an initial slant range of 1000 m and a trajectory that descends linearly down to 100 m. In generating this trajectory, the following assumptions were made: the spacecraft was assumed to move from the beginning to the end of its trajectory in 30 seconds and the frame rate of the LIDAR was 20 Hz, effectively resulting in a new image being taken at every 1.5 m of descent. In this simulation, the gimbal was programmed to point at the target landing site throughout the trajectory except where random noise was injected on specific axes to test the SR algorithm.

Second, an i-load file for the model was created with baseline sensor parameters. For example the FPA was set to 128×128 pixels and the range precision was set to 5 cm. The IFOV, receiver aperture, and transmitter beam divergence were adjusted during the descent as shown in Table 1 (below) to simulate zoom optics adjustments that may be made to keep roughly the same ground footprint throughout the trajectory.

TABLE 1

| Slant Range (m) | IFOV (rads) | Receiver Aperture (m) | Transmitter Beam Divergence (rads) |
|---|---|---|---|
| 1000 | 0.00040 | 0.05 | 0.0512 |
| 750 | 0.00053 | 0.0375 | 0.0678 |
| 500 | 0.00080 | 0.025 | 0.1024 |
| 250 | 0.00160 | 0.0125 | 0.2048 |

Third, a synthetic lunar map with a 10 cm posting was loaded into the simulation as the representative landing site target for the spacecraft equipped with the LIDAR system. The map had an area of approximately 450×450 m, and minimum and maximum map height data of −9.4 m and +4.87 m respectively. After setup was complete, the simulation was executed and range output images were generated for each trigger point throughout the trajectory.

The back project method underlying the present invention will now be discussed. The term "back projection" is commonly used in the area of linear X-ray tomography in which the measured signals are 1-D or 2-D projections of 2-D or 3-D objects, respectively. Calculation of the projections, i.e., solving the direct problem, is performed by integrating an object quantity feature, for example density, along the X-ray path. Back projection, i.e., solving the inverse problem, occurs via a reconstruction technique where the properties of projections are translated back into the object following the X-ray path in the inverse direction.

Figure 2:
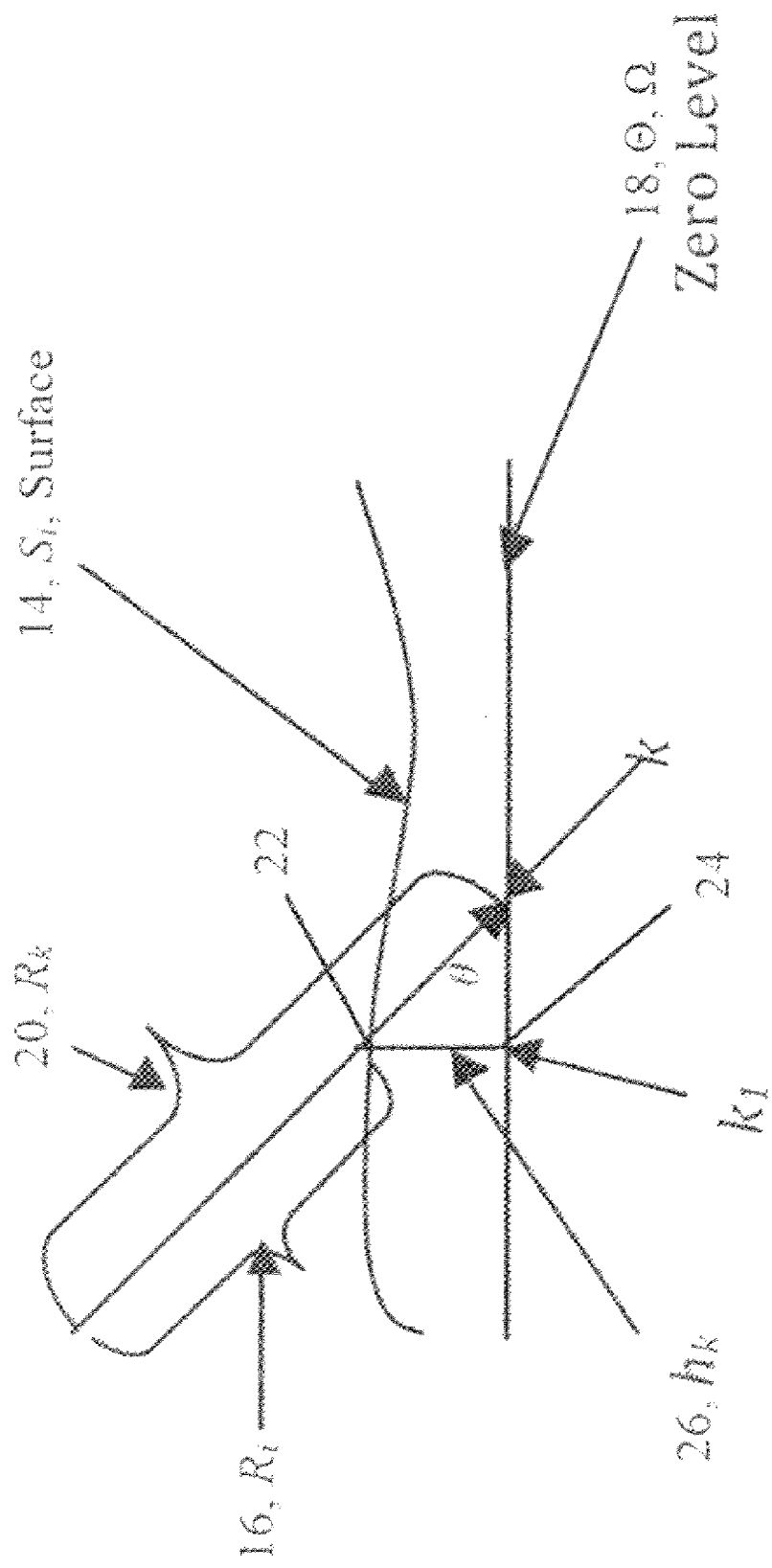
FIG. 2 is a side view illustration of the schematic of FIG. 1, providing additional clarification of the variables identified.

The back projection method may be applied to flash LIDAR data. Using the back projection method for flash LIDAR data implies a model of the measuring process where the following is valid: the range recorded by a detector is the average of the ranges from the detector location to the each point on the reflecting surface, which is located inside of the detector FOV as described by the following equation:

$$R_i(x_1, x_2) = 1/S_i \times \int_{\Omega_i} \int R(x, y) dx \quad (2)$$

where $R_i$ is the range recorded by detector pixel number i; $R(x, y)$ is the range from the point with coordinates (x, y) on the surface, $S_i$, to the detector; and $\Omega_i$ is the domain on the surface corresponding to the detector FOV. In fact, $\Omega_i$ is the projection of the FOV on the flat plane, and $S_i$ is the area of this domain as shown in FIGS. 1 and 2. This model is an approximation, and the level of accuracy of this approximation can be tested after the inverse problem is solved.

The purpose of the SR method of the present invention is to determine elevations on a mesh with cells smaller than $\Omega$. If $\Theta$ is defined as a rectangular mesh with pixel sizes that meet specified requirement, then Equation (2) can be rewritten as Equation (3), which is presented below:

$$R_i = 1 \Big/ N_i \left( \sum_{k=1}^{k=N_i} R_k \right) \quad (3)$$

where k denotes the number of cells on the mesh $\Theta$ that overlap with the projection $\Omega_i$, and $N_k$ is the number of such cells. Equation (3) is a first approximation to Equation (2). Weighting factors may be included to increase the accuracy of the formula. The geometry of the back projection procedure is illustrated in FIGS. 1 and 2.

In one contemplated embodiment of the present invention, the algorithm is executed by performing the following steps:

Step 1: The SR elevation map is initialized as the fine mesh $\Theta$. Then, arrays S, M and D are created. Arrays S(k) and M(k) are working arrays with dimensions the same as $\Theta$. Index k is a 3-D index into the fine mesh $\Theta$. Array D(h) contains the algorithm output—the elevation map on the fine mesh. All arrays are initialized to zero.

Step 2: For each frame and for each individual detector of the FPA, the projection of the FOV on the reference surface (zero elevation level) is determined.

Step 3: The set of cells from $\Theta$ that overlap with this projection are found. Using the center of the cell from $\Theta$ as one point, the one point is connected to the detector by a straight line and the distance is calculated.

Step 4: The difference between the calculated distance and the range registered by the detector indicates the location of the point where the ray crosses the surface. The elevation of this point is calculated by the formula:

$$h_{ki} = (R_k - R_i) \times \sin \theta_i \quad (4)$$

Points k and $k_1$ may be the same or different depending on the angle of incidence.

Step 5: The arrays S and M are updated according to the following:

$$S(k_1) = S(k_1) + h_{k1}$$

$$M(k_1) = M(k_1) + 1 \quad (5)$$

Step 6: This operation continues for all detectors in the current frame. Then, the following normalization procedure is applied:

$$D(k) = S(k)/M(k) \text{ for all } k \quad (6)$$

Step 7: Finally, steps two through six are repeated for all frames of the data. The DEM may be constructed after completion of these seven steps.

Several computational experiments were performed to test the SR procedure of the present invention. These experiments focused primarily on construction of a DEM with sub-pixel resolution using data collected from various trajectories. All tests were performed using five basic steps:

Step 1: A simulated spacecraft trajectory and select a target map were generated.

Step 2: The generation of flash LIDAR data (frames) throughout the trajectory was generated.

Step 3: Controlled, random noise was added to all of the frames.

Step 4: The back projection method was applied to the data and the restored DEM was constructed.

Step 5: Finally, the original "true" frames were compared with the constructed DEMs using basic statistical metrics.

First Test Case

In a first test case and in all subsequent test cases, the model of the flash LIDAR was used to generate the simulated LIDAR data. The original map was chosen from a synthetic lunar terrain database in POST II. The map was classified as a smooth mare terrain type with 10% rock abundance. The LIDAR input map was created from a portion of the original lunar map on a rectangular grid with 1024×1024 pixels. LIDAR data were generated using a nadir) (90° approach trajectory to this map starting with a slant range of 1000 m descending down to 100 m. The sizes of the frames were 128×128 pixels. Zoom optics were implemented, as previously discussed, with zoom changes as shown in Table 1. A low resolution DEM was generated using only the first frame of the data.

Figure 3:
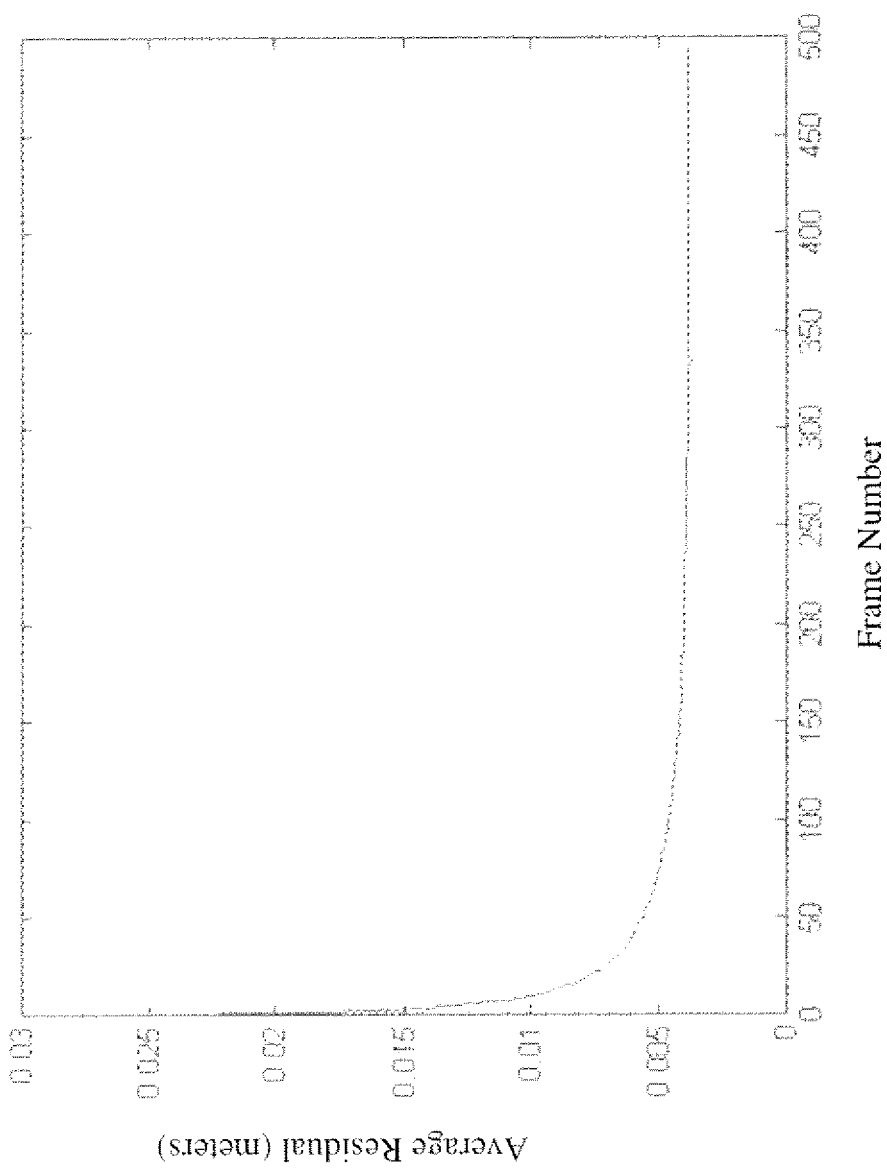
FIG. 3 graphically depicts the Average Residual data with respect to Frame Number for a first test case associated with the present invention.
Figure 4:
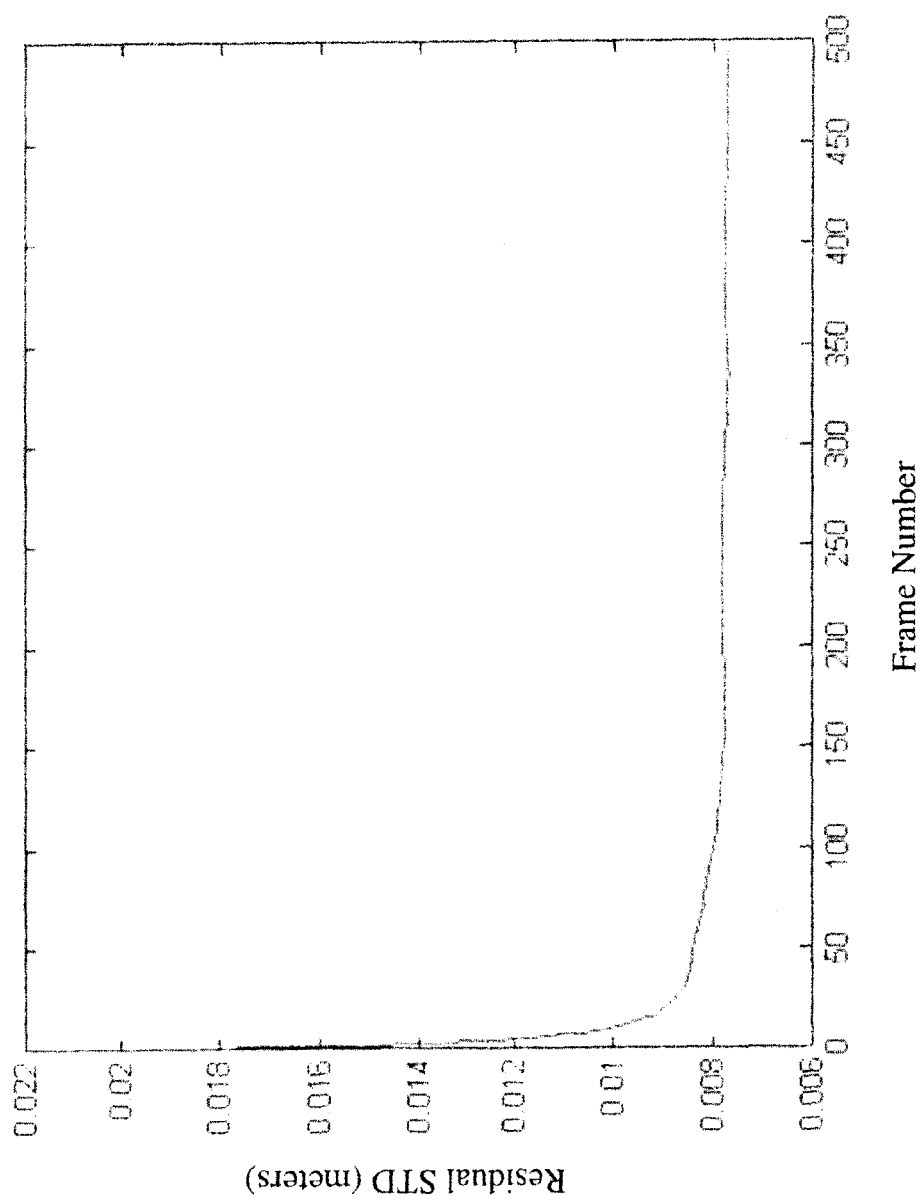
FIG. 4 graphically depicts the Standard Deviation of the Residual (Residual STD) data with respect to Frame Number for a first test case associated with the present invention.
Figure 5:
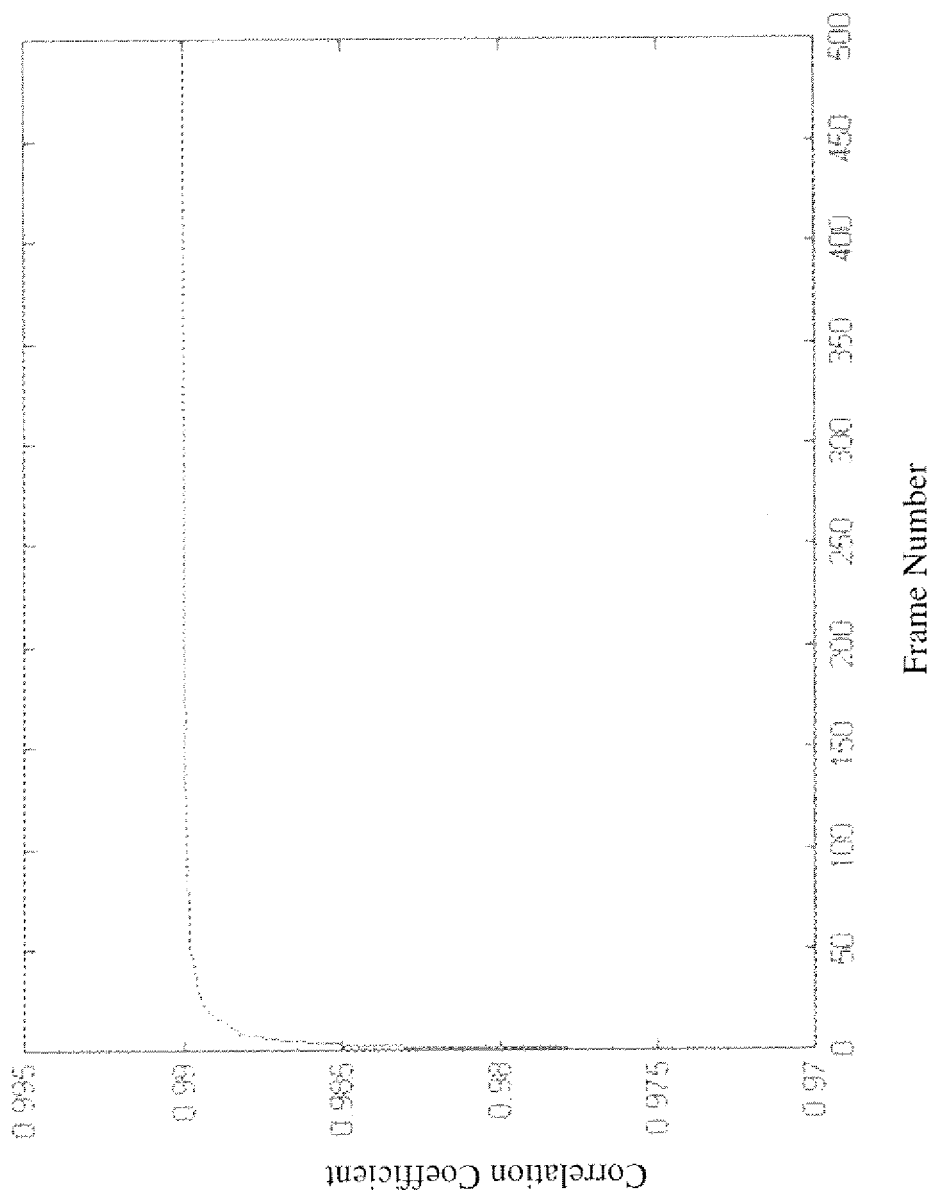
FIG. 5 graphically depicts the Correlation Coefficient data with respect to Frame Number for a first test case associated with the present invention.

The back projection algorithm of the present invention was then applied using the first 160 frames. Using the present invention, it was found that the restored high resolution map showed dramatically improved image quality. The results of changes in the mean residual, residual STD, and correlation coefficients for the maps are shown in FIGS. 3, 4, and 5, respectively. As is apparent from these figures, minimal increases in image quality are gained after only a few frames of data. Convergence appears to have been reached after about 30 frames of data as illustrated by the asymptotic nature of the graphs provided.

Second Test Case

For a second test case, the synthetic flash LIDAR data were generated using the same set of LIDAR parameters, optical zoom changes, and map that are discussed above in connection with the First Test Case. The spacecraft trajectory also was the same except that a simulated jitter was injected onto the spacecraft by applying a normally distributed random variable with zero mean and a standard deviation of 0.1° (1.745 mrads) along the spacecraft's z-axis.

Figure 6:
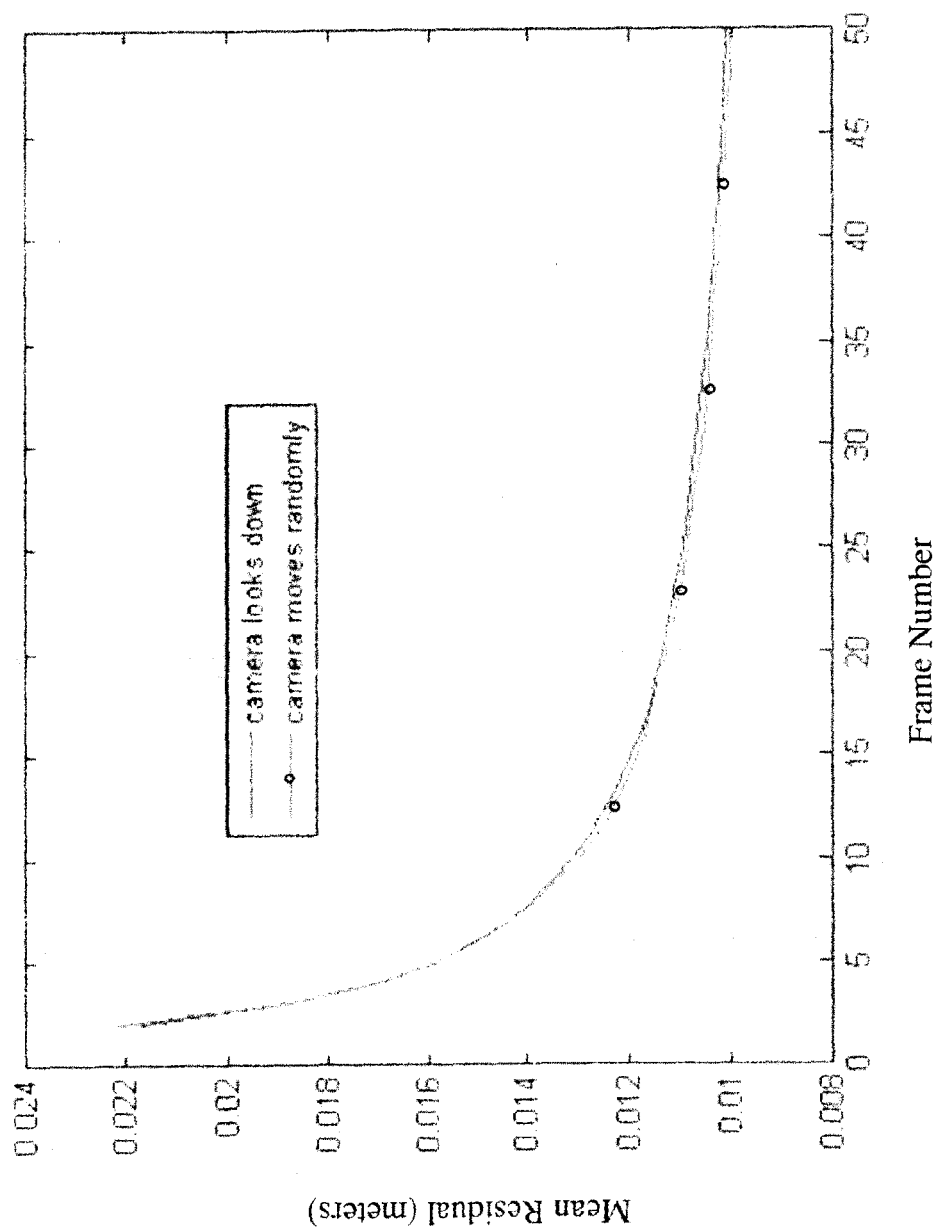
FIG. 6 graphically compares the Mean Residual data with respect to Frame Number for a second test case associated with the present invention.
Figure 7:
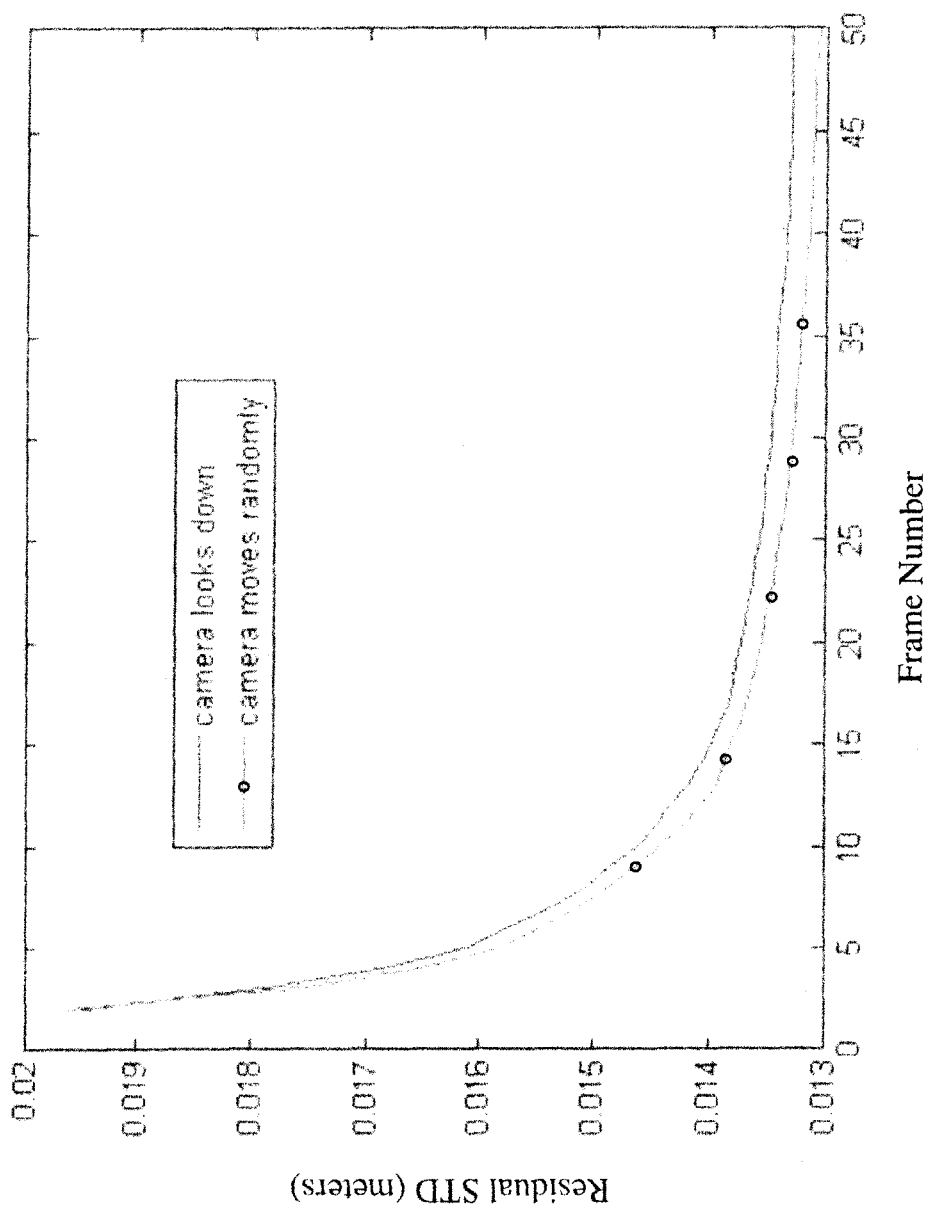
FIG. 7 graphically compares the Residual STD data with respect to Frame Number for a second test case associated with the present invention.
Figure 8:
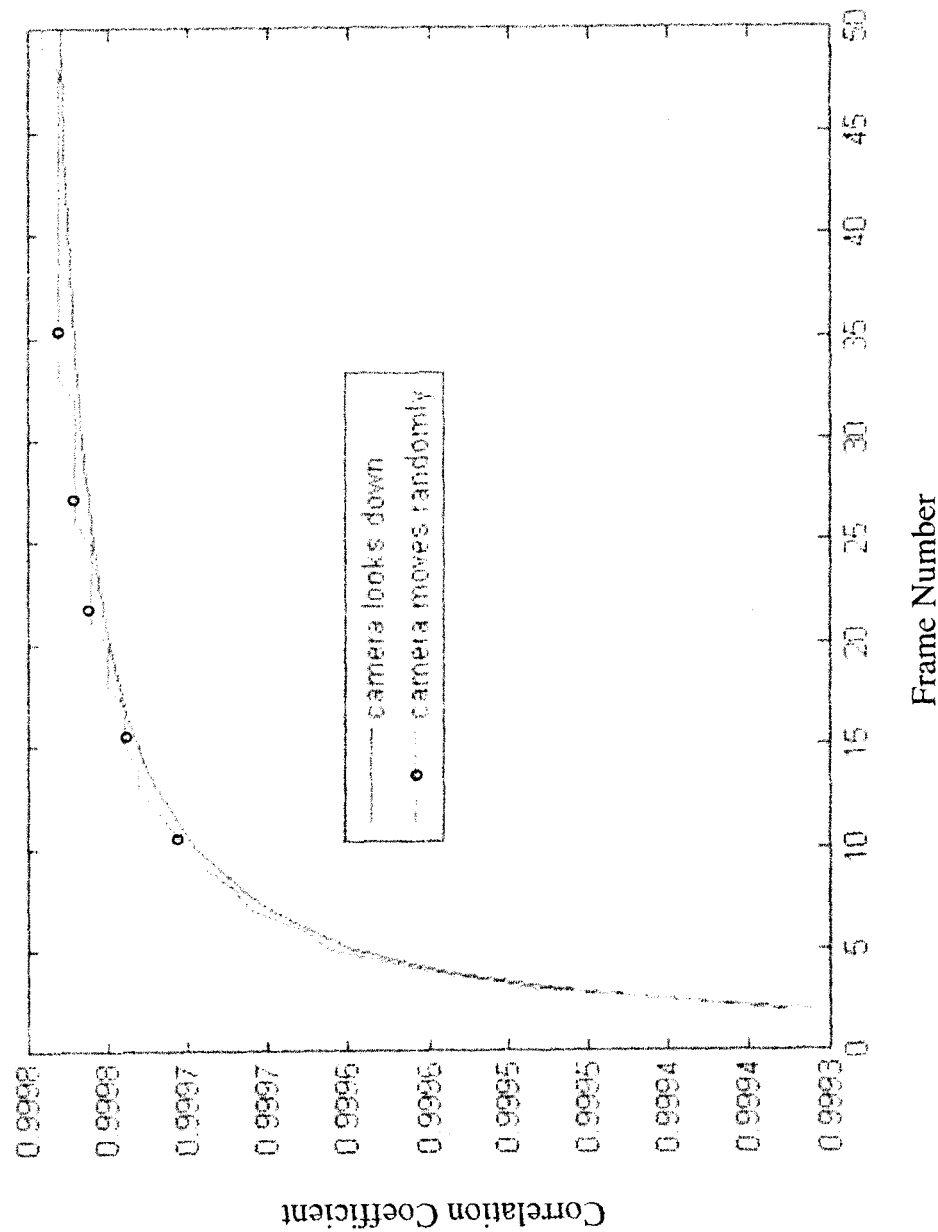
FIG. 8 graphically compares the Correlation Coefficient data with respect to Frame Number for a second test case associated with the present invention.

The mean of the residual, standard deviation of residual, and correlation coefficient, all calculated between the true and restored maps are shown in FIGS. 6, 7, and 8. The results indicate a slight improvement in the performance of the SR algorithm of the present invention when jitter is applied to the flash LIDAR, and thus subsequent output data, than without jitter. This is due to the inherent nature of SR processing which takes advantage of any slight misalignment in correlated images. Thus, this type motion presents an advantage, since any real spacecraft will have some level of jitter during operation.

Third Test Case

In a third test case, the synthetic flash LIDAR data was generated using the same set of LIDAR parameters, optical zoom changes, and map that were used in the First Test Case. Simulated jitter was removed in this Third Test Case and a new, initial 45° incidence angle trajectory was flown by the simulated spacecraft. The spacecraft moved from ≈700 m down to 250 m in altitude (z-axis), while the slant range decreased from ≈1000 m down to 100 m.

Figure 9:
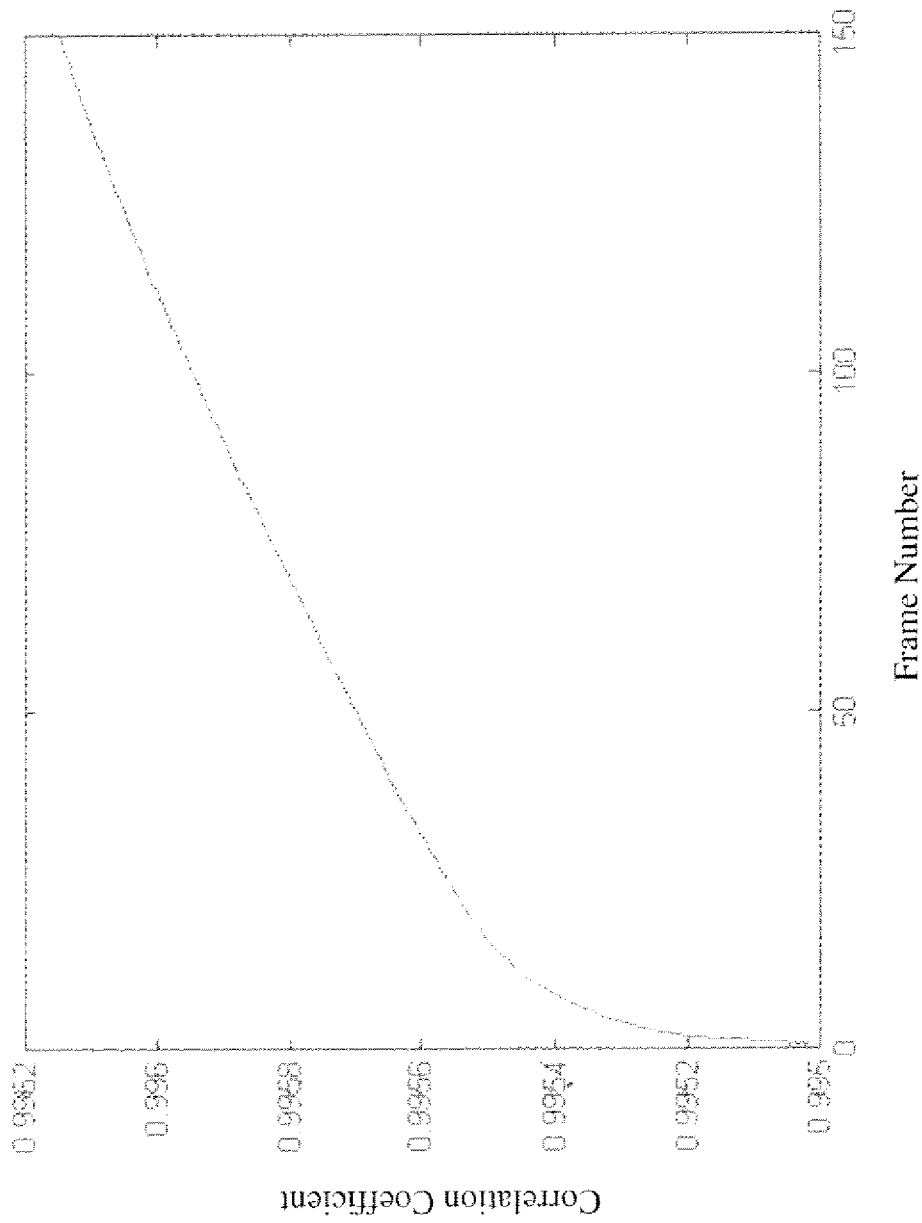
FIG. 9 graphically depicts the Correlation Coefficient data with respect to Frame Number for a third test case associated with the present invention.
Figure 10:
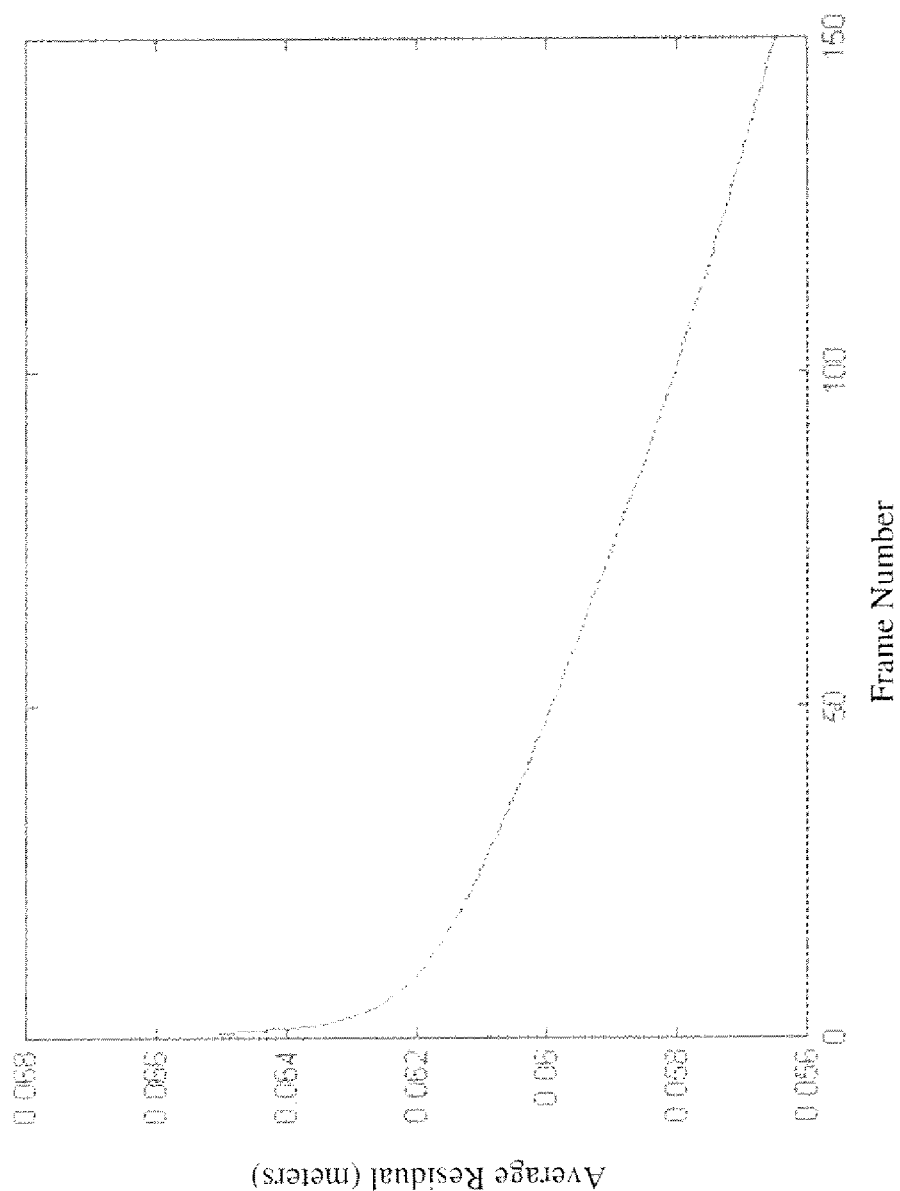
FIG. 10 graphically depicts the Average Residual data with respect to Frame Number for a third test case associated with the present invention.
Figure 11:
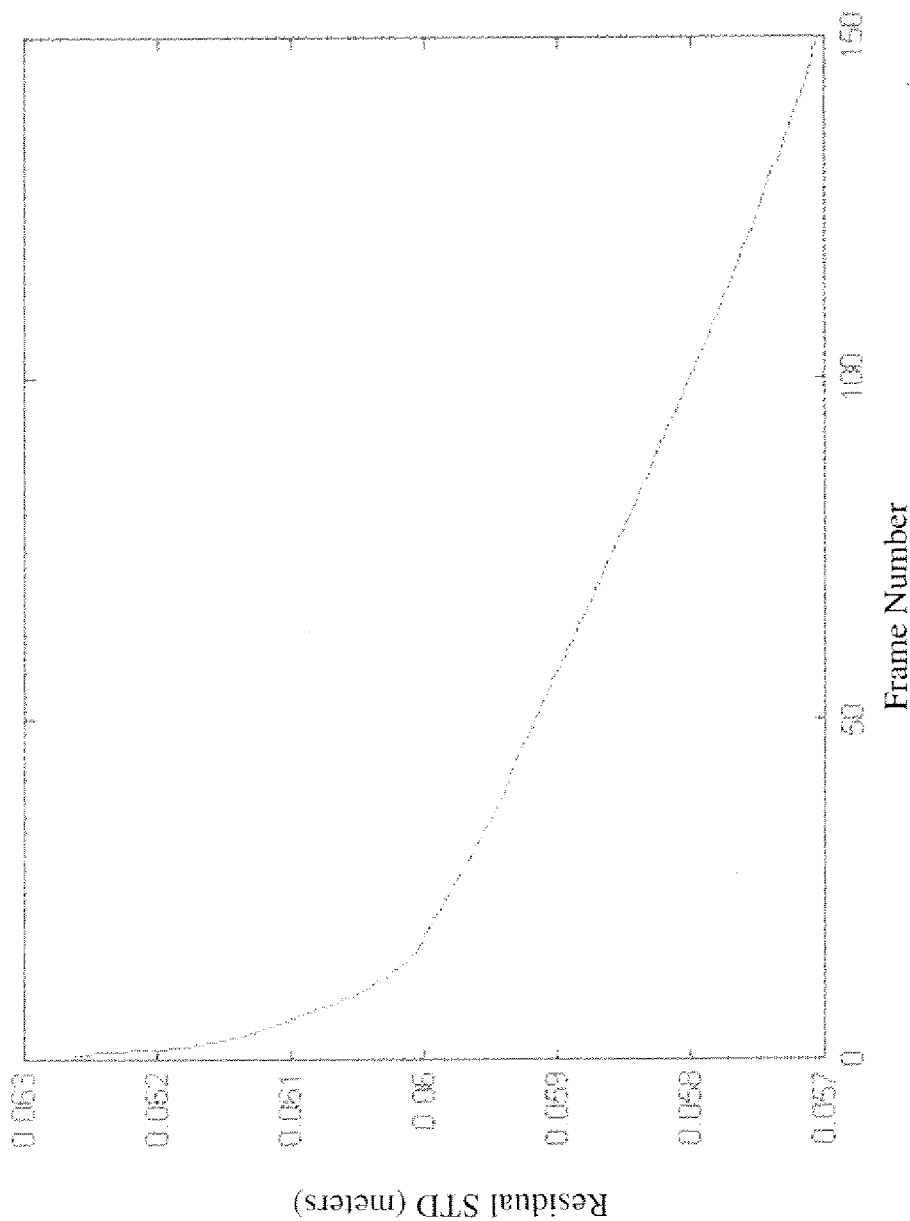
FIG. 11 graphically depicts the Residual STD data with respect to Frame Number for a third test case associated with the present invention.

In this Third Test Case, the iteration interval used for processing was 50 frames. The correlation coefficient, mean residual, and standard deviation between the original and restored images are shown in FIGS. 9, 10, and 11. The initial noise level on the ranges was ≈10 cm and the measurements contained a significant number of dropouts. After SR processing, the standard deviation of the residual between the original "true" map and the restored map was improved to ≈5 cm.

Fourth Test Case

Figure 12:
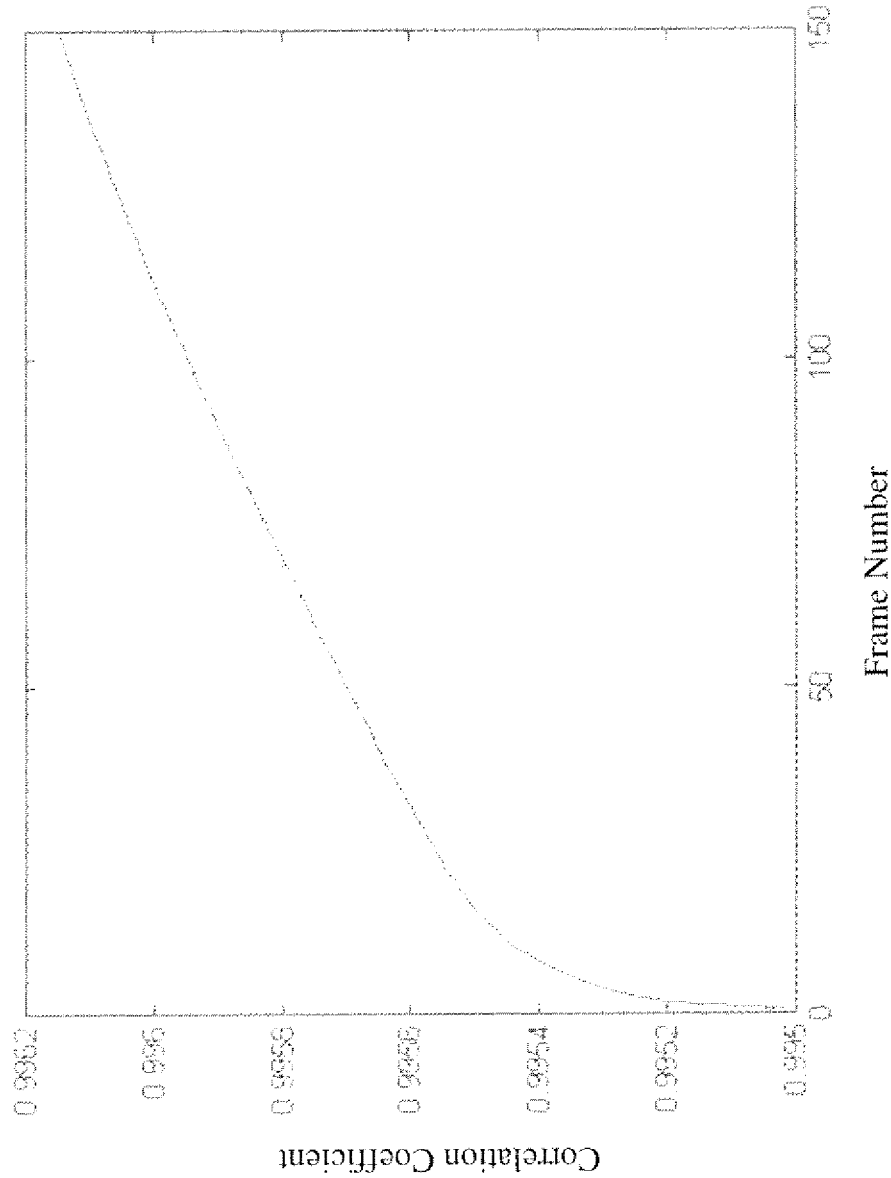
FIG. 12 graphically depicts the Correlation Coefficient data with respect to Frame Number for a fourth test case associated with the present invention.
Figure 13:
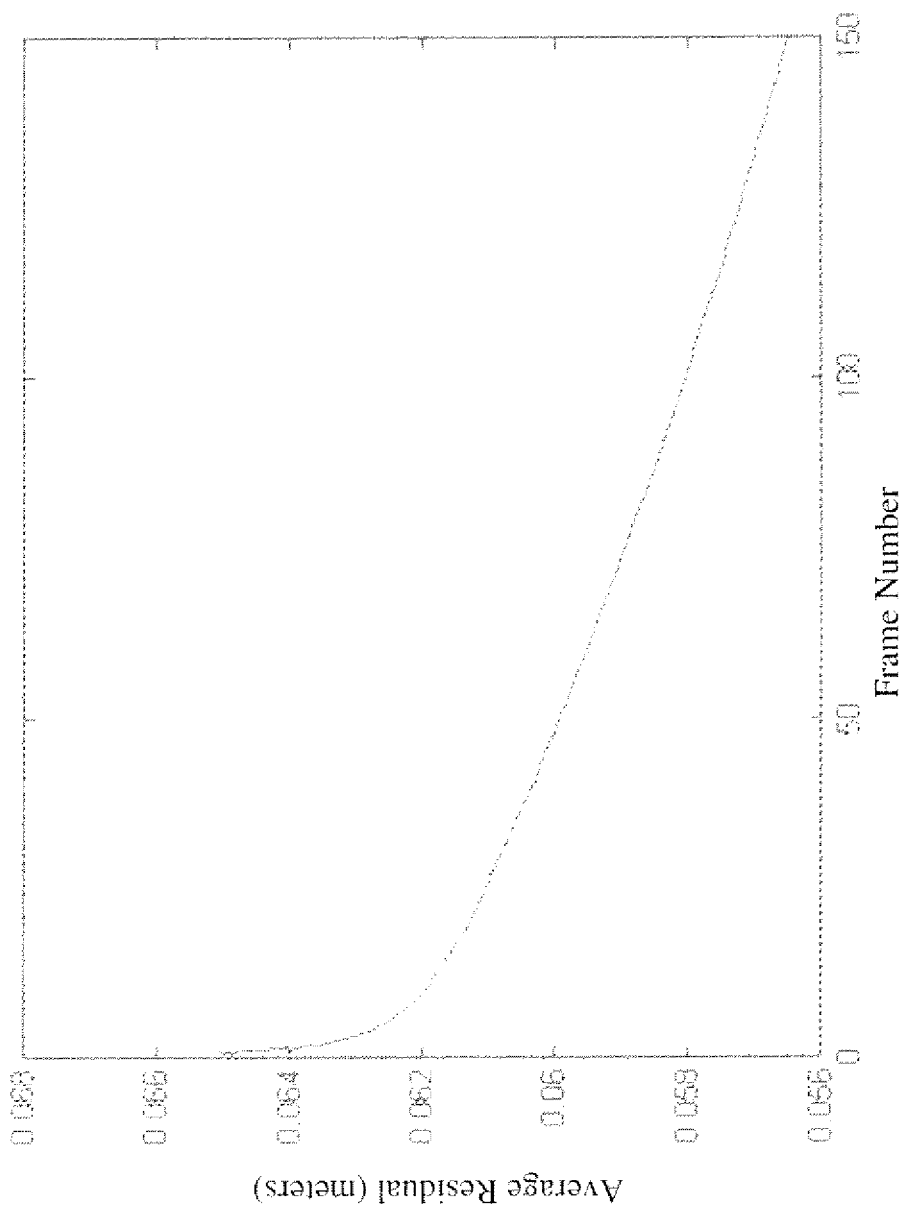
FIG. 13 graphically depicts the Average Residual data with respect to Frame Number for a fourth test case associated with the present invention.
Figure 14:
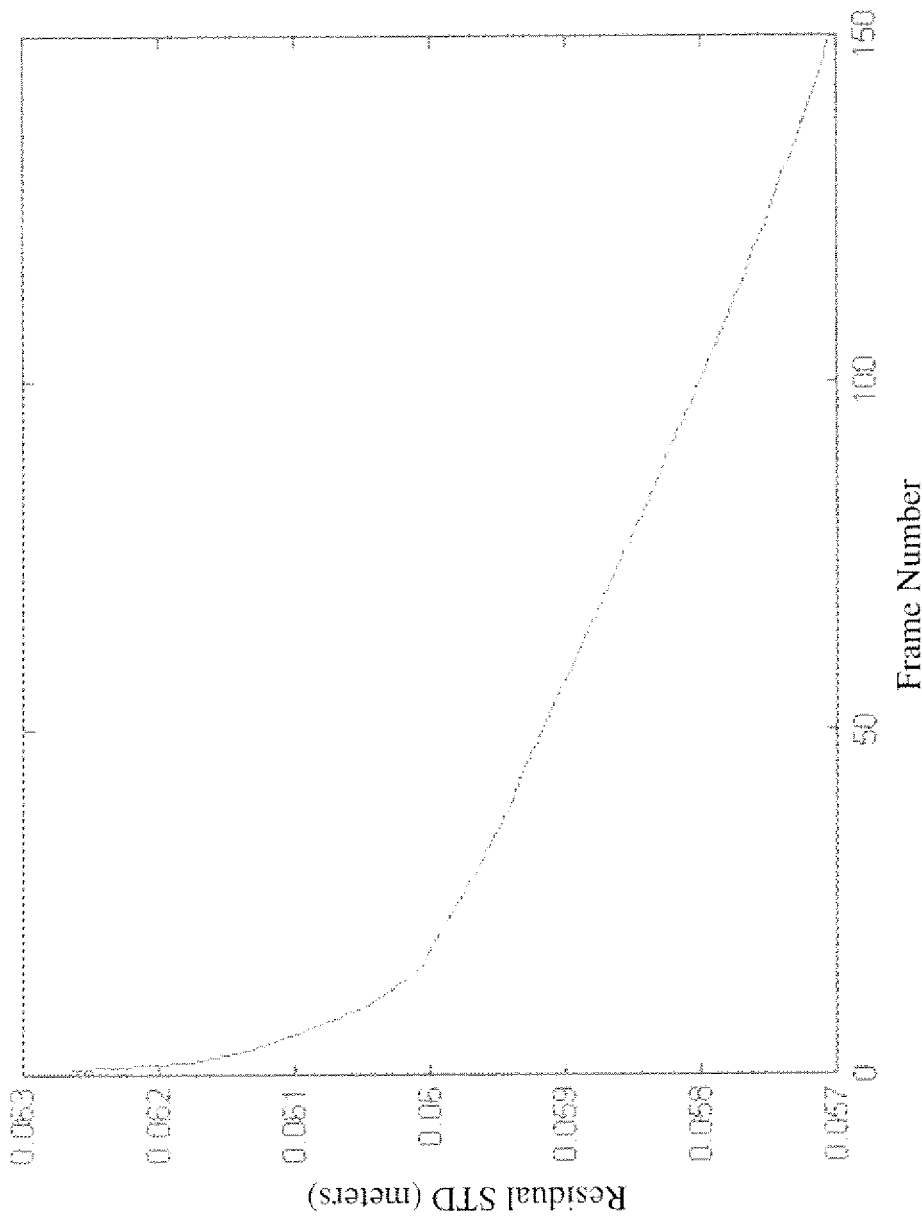
FIG. 14 graphically depicts the Residual STD data with respect to Frame Number for a fourth test case associated with the present invention.

In a fourth test case, the synthetic flash LIDAR data was generated using the same set of LIDAR parameters, optical zoom changes, and map that were used in the Second Test Case. The trajectory flown by the simulated spacecraft was modified to have a challenging 15° incidence angle. Again, the SR algorithm of the present invention was applied to the areas that were covered by the LIDAR footprint. The restored DEM, using iteration intervals of 1 and 50 frames, showed an increased image quality. Even for this shallow angle trajectory, the SR algorithm of the present invention provided significant improvement. The correlation coefficient, mean residual, and standard deviation between original and restored images are for this Fourth Test Case are provided in FIGS. 12, 13, and 14. These statistics corroborate previous results.

As discussed above, the present invention was implemented on a spacecraft model flying various, simulated, landing trajectories. The gimbal pointed the LIDAR to a target landing site throughout the trajectory. The flash LIDAR illuminated a synthetic lunar terrain, processed the returned signal with typical sensor noise characteristics, and output a range image which was subsequently processed by the SR algorithm of the present invention. Original, input maps to the LIDAR, and the processed SR maps were evaluated for visual quality and compared with basic statistical measures.

The results show that the algorithm of the present invention improves the spatial resolution of noisy, low resolution flash LIDAR images and provides a high level of accuracy and precision in the final output DEMs. The present invention also proves to be robust when applied to different viewing angles. The present invention also may be implemented in real time using hardware processors. The production of high quality imagery and the potential for real-time implementation is a benefit of the present invention. Combined together with an ortho-rectification algorithm, and a hazard detection/hazard relative navigation algorithm, the SR algorithm of the present invention may be used to provide a critical component for performing autonomous and safe landings.

The back projection method (SR algorithm) of the present invention will now be discussed in greater detail.

FIG. 1 is a perspective schematic that illustrates the approach taken with respect to the present invention. A detector 10 and an emitter 12 are shown. The detector 10 and the emitter 12 are understood to be integrated into a spacecraft, the details of which are not shown. As should be apparent, the present invention may be applied to any vehicle regardless of its construction. The emitter 12 emits laser light that is directed to a geographic surface 14. The geographic surface 14, at least for purposes of discussion, represents a field of view of the detector 10 and also is a portion of a landscape, such as a lunar landscape.

It is noted that the detector 10 tested as a part of the development of the present invention incorporated a detector 10 with a 128×128 array of detector pixels, each of which are represented by the designation i. In other words, the detector incorporated 16,384 detector pixels. For purposes of the present invention, it may be said that the invention incorporates a plurality of detectors i, each of which corresponds to an individual pixel in the detector array. The exact number of detector pixels i is not critical to operation of the present invention and any number maybe employed without departing from the scope of the present invention.

Light emitted from the emitter 12 reflects from the surface 14 and, as reflected light 16, is detected by each of the detector pixels i in the detector 10. As should be apparent to those skilled in the art, the detector 10 may be any suitable type of detector that incorporates electronics capable of generating a two dimensional (or three dimensional) pixel map that represents the data presented by the reflected light 16. The detector 10, therefore, may be any suitable type of photo detection device, as should be known to those skilled in the art. The output from the detector 10 is referred to herein as a frame of data. As should be apparent to those skilled in the art, a frame of data typically comprises a two dimensional array of digital data. The array of digital data may be rectangular, square, or any other suitable shape, as required or as desired.

In the present invention, the frame of data includes range data R from the detector 10 to the surface 14 within the field of view of the detector 10. As should be apparent, for each pixel i in the frame of LIDAR data, there will be an associated range $R_i$ between the detector 10 and the surface 14 for each detector pixel.

In the context of the detector 10 discussed above, each pixel i in the data array will have a corresponding range 16, $R_i$ that is associated with a coordinate $S_i$ on the surface 14 that has been sampled. Alternatively, the ranges are referred to herein at $R_i$. $R_i$ is used to abbreviate reference to any particular pixel in the array, with the understanding that each pixel in the array is given a unique number i that identifies the detector i associated with a specific geographic location (x, y). In other words, the LIDAR frame of data will include i pixels, each of which corresponds to an area $S_i$ on the lunar surface (in this one example). "S" also is used to refer to the surface 14 for mathematical purposes.

As further definitional background to the present invention, and with continued reference to FIG. 1, an elevation map Θ is defined. The elevation map Θ includes a number of cells k. The plurality of cells k define an array of values with A×B pixels. The array may be square, such that A=B. Alternatively, the array may be rectangular such that A>B. Other variations also may be employed without departing from the scope of the present invention. In the context of the present invention, the mesh Θ was defined as an array of 1024×1024 pixels. As a result, for at least one embodiment of the present invention k>>i (i.e., 1024 >>128).

As should be apparent from the foregoing, the number of pixels k may not be the same as the number of detectors i. There may be a larger or a fewer number of pixels k in the elevation map than there are detectors i that generate the flash frame of LIDAR data. Alternatively, there may be a larger number of areas $S_i$ than cells k in the map. Naturally, the number of areas $S_i$ for the surface 14 will correspond with the number of pixels i in the detector 10.

Once the projection of flash LIDAR field of view on a projected flat plane 18 is defined, typically as a zero elevation, a range may be calculated from the projected flat plane 18 to the detector along a ray 20. The ray 20 is shown in FIG. 1. The ray 20 is the distance from the detector pixel to the projected flat plane 18. As illustrated in FIG. 1, the range 16 from a detector pixel in the detector 10 to the surface 14 is the distance from the detector pixel to a first point 22 on the surface 14. The length of the ray 20 from the detector to the projected flat plane 18 is the calculated distance from the detector 10 to a second point 24 on the projected flat plane 18. As should be apparent, once the first point 22 and the second point 24 are defined, it is possible to calculate a distance 26 between the first point 22 and the second point 24. This distance is referred to as a height h. The height h permits generation of the DEM.

Figure 15:
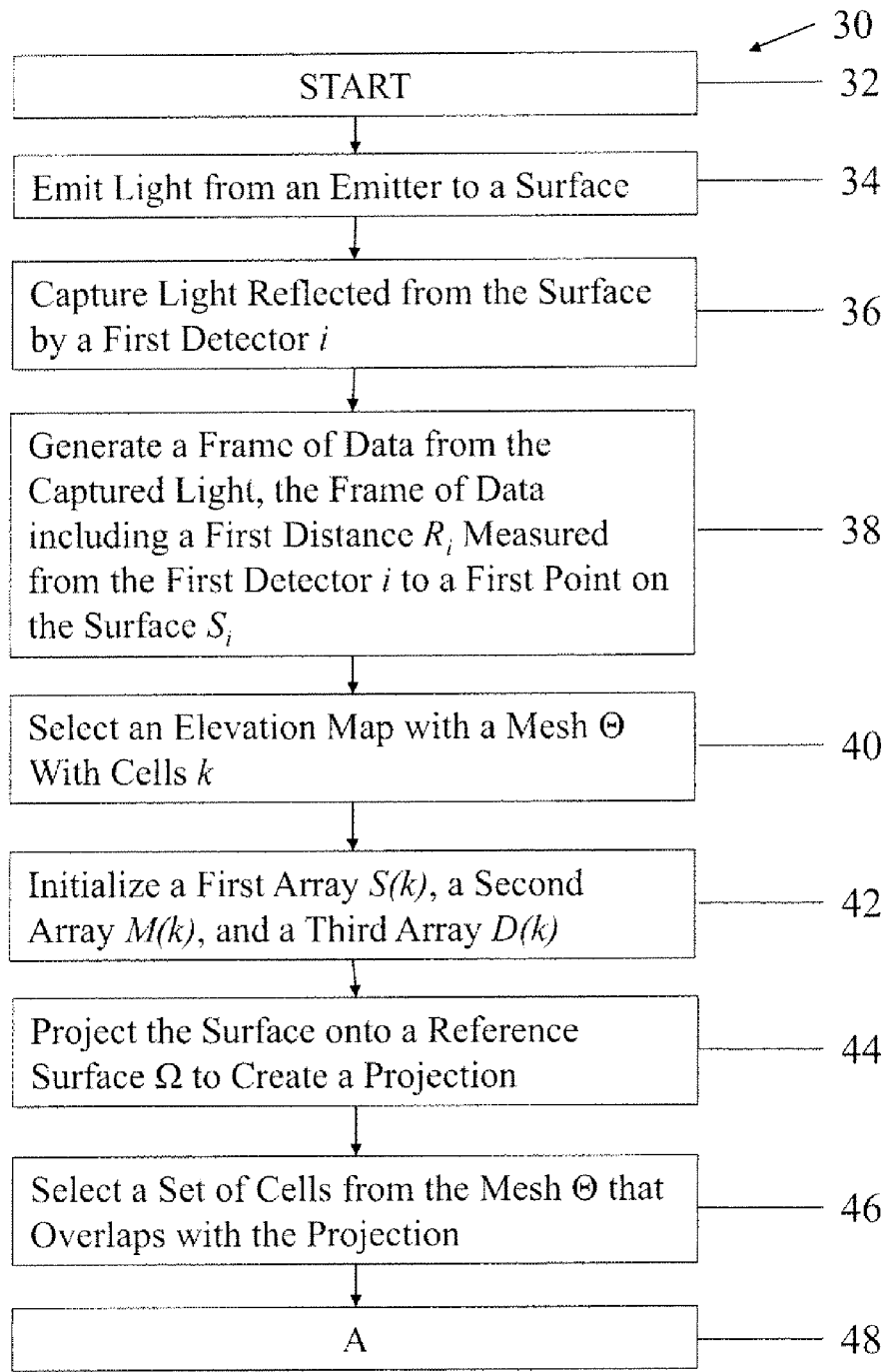
FIGS. 15-16 provide a flow chart for a first method according to the present invention.
Figure 16:
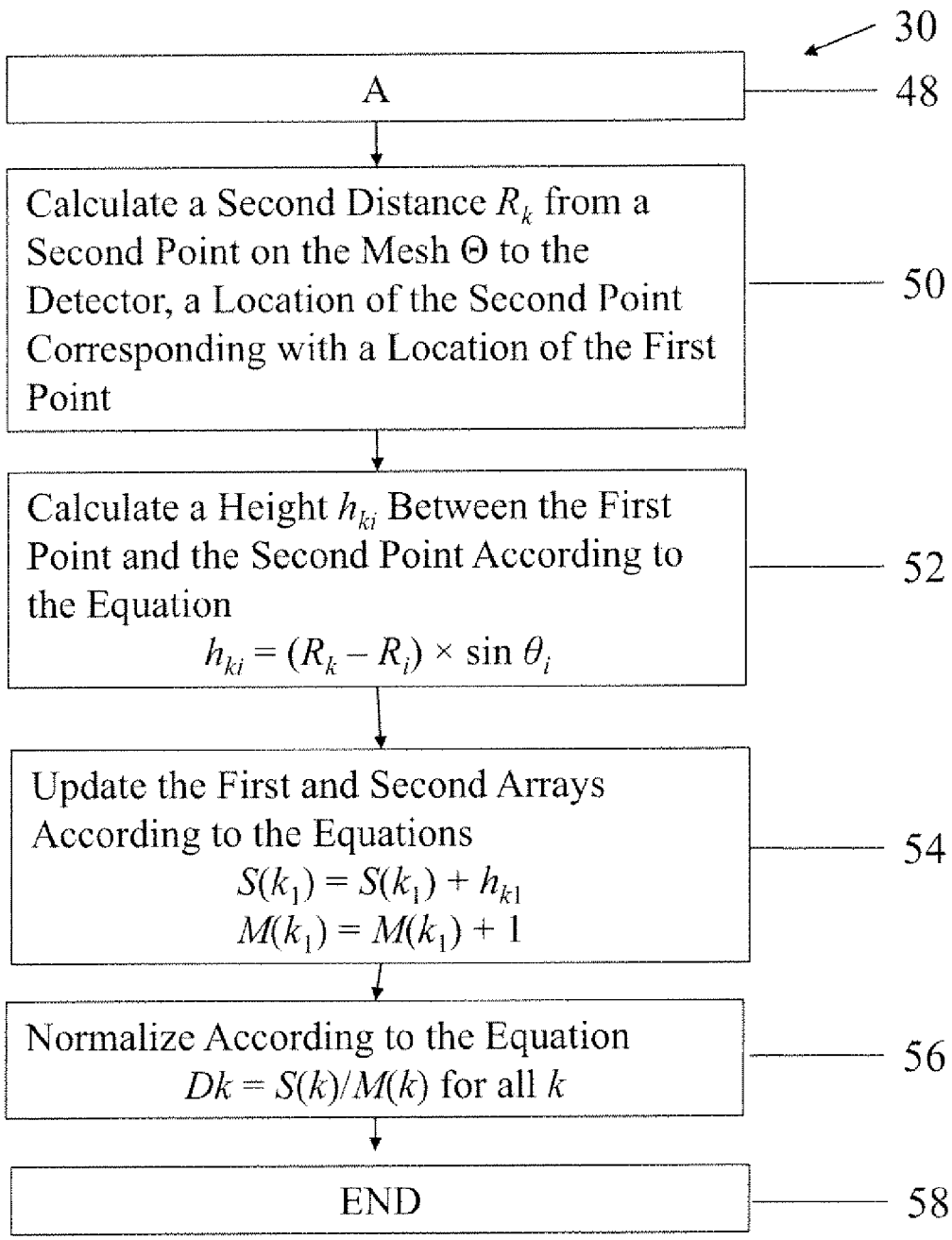

Having defined the variables, reference is now made to FIGS. 15-16, which illustrate the back projection method of the present invention for generation of a DEM for use on or with a vehicle such as a spacecraft.

The back projection method 30 of the present invention will now be described in terms of various steps that are identified in FIGS. 15-16. It is noted that the definition of the steps is not intended to be limiting of the present invention. One or more of the steps may be combined with others of the steps without departing from the scope of the present invention. In other words, the definition of a "step" is not intended to be limiting of the present invention. The use of steps is employed merely as an example of one contemplated embodiment of the present invention.

As illustrated in FIG. 15, the back projection method, which permits the generation of a DEM of sufficient quality, starts at step 32. At step 34, light is emitted from an emitter 12 that is part of the flash LIDAR apparatus incorporated into the vehicle. The emitted light is directed to the surface 14. Light reflected from the surface 14 returns to the detector 10. The reflected light travels along the ray 16 to the detector 10 and is detected by the detector pixels (also referred to as the detectors) i. At step 36, the reflected light is captured by the detector pixels i in the detector 10.

With respect to the method 30, it is noted that a single detector i is discussed. The detector i is intended to refer to a single detector pixel i or to the array of detector pixels i. Discussion of the method 30 is made with respect to a single pixel, but it is to be understood that the discussion applies to the array of pixels as already noted.

At step 38, a frame of data is generated from the captured light by the detector 10. The frame of data is a digital frame of data that includes, among other aspects of the surface S, a range $R_i$ distance for each pixel i. While the contemplated embodiment relies upon a processor incorporated into the detector 10 to generate the frame of data, the processor need not be a part of the detector 10. To the contrary, the processor 10 may be a component separate from the detector 10 without departing from the scope of the present invention.

As noted the frame of data generated by the detector 10 includes a rang 16, $R_i$, which is measured as the distance from the detector 10 to a first point 22 on the surface S. As should be apparent, the range 16 will be a plurality of ranges $R_i$, one for each pixel i.

At step 40, an elevation map with a mesh Θ is defined. The mesh Θ typically will be defined by a processor associated with the detector 10. The mesh Θ includes a number of cells k. In one embodiment contemplated for the present invention, the cells k are arranged in a 1024×1024 array, as discussed above.

Once the mesh Θ, which is understood as a fine mesh, has been defined, the method 30 proceeds to step 42. In this step, three arrays are initialized. The three arrays are a first array S(k), which corresponds to the array for the surface 14, $S_i$ a second array M(k), which corresponds to a projected flat plane 18 for the mesh Θ, and a third array D(k) that receives output and corresponds to the DEM generated from the frame data processed by the SR algorithm for the present invention. As noted, the value k corresponds to the cells k that make up the mesh Θ.

The method 30 then proceeds to step 44, where the surface 14 is projected onto the mesh Θ that overlaps with the projection. By this process, as should be apparent from the discussion above, the array of i values that correspond to the number of detectors i are increased, at least in this embodiment, to an array of k values corresponding to the number of cells k in the mesh Θ.

At step 46, the set of cells k that overlap with the projection are selected.

FIG. 15 includes a transition block A, labeled with the reference number 48, that provides a transition to the remainder of the method 30 illustrated in FIG. 16. The transition block appears at the top of FIG. 16.

With reference to FIG. 16, the method 30 continues to step 50 where a second distance $R_k$ is calculated. The second distance or range $R_k$ is calculated as a distance from the second point 24 on the mesh Θ to the detector 10. This distance or range $R_k$ is labeled as the ray 20 in FIGS. 1 and 2, as identified above.

Having established the ranges 16, $R_i$ and 20, $R_k$, the method 30 proceeds to step 52 where the height $h_{ki}$ is calculated according to the equation:

$$h_{ki}=(R_k-R_i)\times\sin\theta_i \quad (4)$$

The height $h_{ki}$ is identified as the line 26 in FIGS. 1 and 2 for clarity. The angle θ is denoted in FIG. 2

The method then proceeds to step 54, where the first array S(k) and the second array M(k) are updated. This is done via the following equations:

$$S(k_1)=S(k_1)$$

$$M(k_1)=M(k_1)+1 \quad (5)$$

As noted above, the first array S(k) and the second array M(k) were initialized to zero. Having processed the flash LIDAR data as discussed above, the values are now updated to incorporate the calculated data.

The method 30 then proceeds to step 56, where the third data array D(k) is normalized using the updated values for the first array S(k) and the second array M(k).

The method 30 then ends at step 58.

It is noted that the steps identified above represent one iteration of the sampling of frames of flash LIDAR data generated by the detector 10. As discussed above, if a larger number of frames of LIDAR data are employed, the accuracy of the DEM is increased. As noted above, it is anticipated that, if about 30 frames of LIDAR data are used, a DEM of sufficient quality can be produced. Since the detector 10 of this embodiment of the present invention operates at a frequency of 30 Hz, it is possible to create a DEM of sufficient quality from 30 frames of LIDAR data in one second, which results in the creation of a DEM in real time. As should be apparent to those skilled in the art, a larger or smaller number of frames of LIDAR data may be employed, as required or as desired.

It is noted that the sampling rate of 30 Hz is merely the rate contemplated for one embodiment of the present invention. A larger or a smaller sampling rate may be employed without departing from the scope of the present invention.

Reference is now made to FIG. 17. FIG. 17 provides a schematic overview of an operation diagram 60 of a vehicle according to the present invention. The flash LIDAR 62 of the present invention receives information about the terrain 64 in the manner discussed above, by emitting laser light and capturing reflected light from the terrain or surface 14. In addition, the flash LIDAR apparatus 62 also receives sensor parameters 66 that include, but are not limited to, IFOV, receiver aperture, laser power, beam divergence, and sample rate. Other parameters that may be received include, but are not limited to, the vehicle's attitude and position, which are derived from the spacecraft's slant range, path angle and gimbal orientation.

The data is then processed to transform the data, via the transformation processor 68 to generate the DEM. The DEM may then be provided to a hazard detection algorithm processor 70 and the output may be provided to a guidance, navigation, and control processor 72 that controls the operation of the vehicle. Separately, a visualization of the processors 74 may be outputted. The visualization may be a digital elevation map or an equivalent for additional processing or generation of a visual representation of the surface terrain 14. The operational schematic 60 illustrated in FIG. 17 provides a starting point to discuss at least a second aspect of the present invention, which is directed to the navigation of a vehicle, such as a spacecraft, using the flash LIDAR data.

It is recognized that the creation of a DEM is not required for operation of a vehicle such as a spacecraft. To the contrary, the data processed by the vehicle on a frame by frame basis can provide significant information for guiding and controlling the vehicle even the absence of the generation of a DEM of sufficient quality.

A general overview of the GNC of the vehicle will be provided before describing one embodiment of the method contemplated for the present invention.

As discussed above, the flash LIDAR apparatus generate frames of flash LIDAR data at a rate of 30 Hz, at least in one embodiment of the present invention. Therefore, each frame of LIDAR data has associated with it a predetermined time index of 1/30 of a second. When subsequent frames of LIDAR data are correlated with one another, therefore, it is possible to appreciate the change between frames of LIDAR data for each time interval. This provides data concerning the speed and position of the vehicle with respect to a selected area (i.e., a reference area) on the surface 14. As a result, it becomes possible to generate parameters for input to a GNC processor for the vehicle to control the vehicle in its descent to the surface 14. In other words, the DEM does not need to be generated for input to the GNC processor. Instead, an offset (otherwise referred to as an optical flow) between frames of LIDAR data can be used as input to a GNC processor. This operation may be employed in combination with the generation of the DEM, as discussed above, for control of a vehicle according to the present invention.

A method of navigating a vehicle 80 will now be described in connection with FIGS. 18-20.

Figure 18:
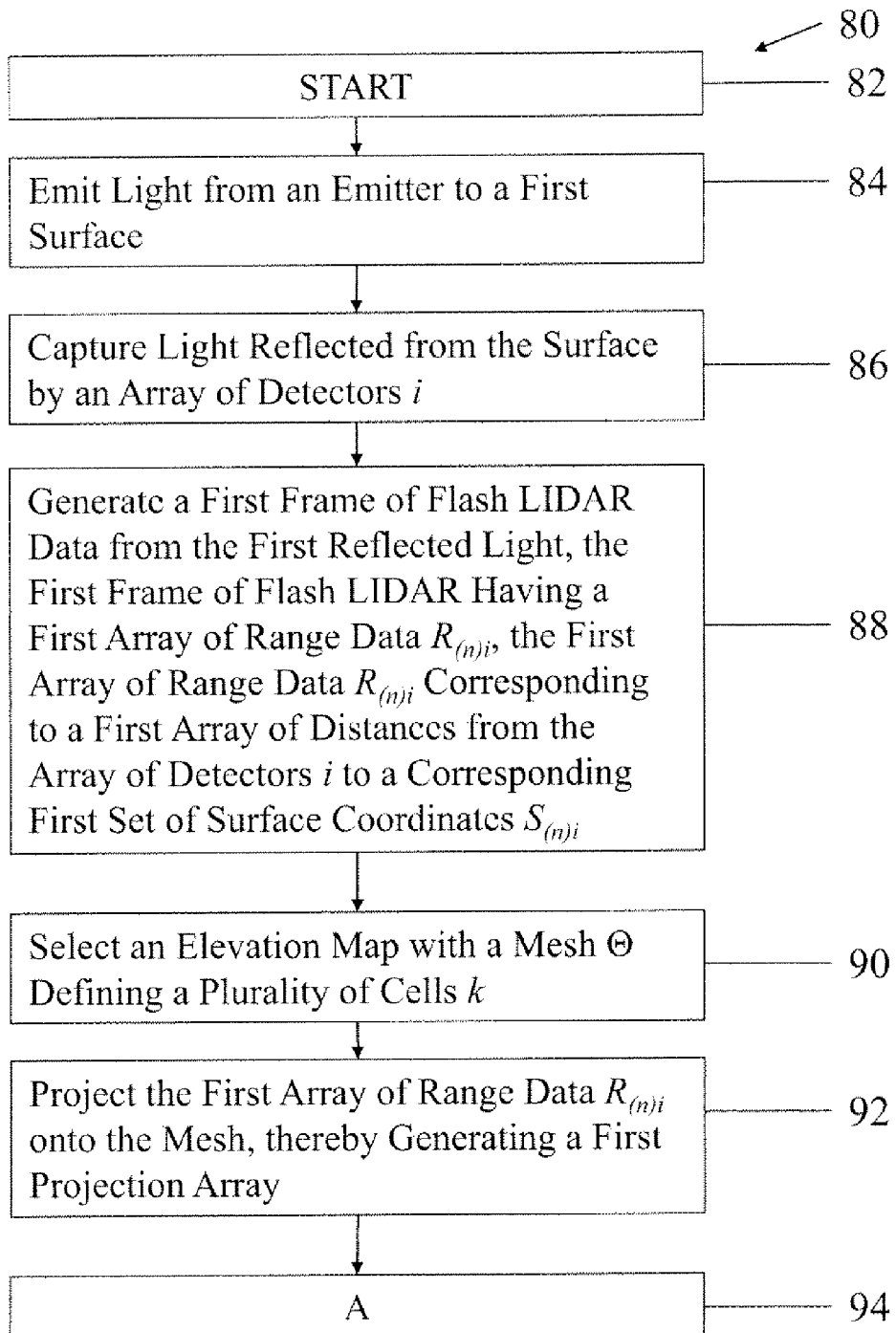
FIGS. 18-20 provide a flow chart for a method according to the present invention.

FIG. 18 illustrates a method 80 for navigating a vehicle. The method 80 starts at 82. At step 84, light is emitted from an emitter 12 to a surface 14. This step is consistent with step 34 of the method 30 described above. At step 86, light reflected from the surface is captured by the array of detectors i that are a part of the detector 10 of the flash LIDAR apparatus, the details of which are provided above. At step 88, a first frame of flash LIDAR data is generated from the first reflected light. The first frame of flash LIDAR is made up of a first array of range data $R_{(n)i}$ as discussed above. The first array of range data $R_{(n)i}$, corresponds to a first array of distances from the array of detectors i to a corresponding first set of surface coordinates $S_{(n)i}$. At step 90, an elevation map is selected with a mesh $\Theta$ defining a plurality of cells k. Consistent with the method 30, the mesh $\Theta$ is envisioned to be a an array of 1024×1024 pixels. At step 92, the first array of range data $R_{(n)i}$ is projected onto the mesh, thereby generating a first projection array.

Figure 19:
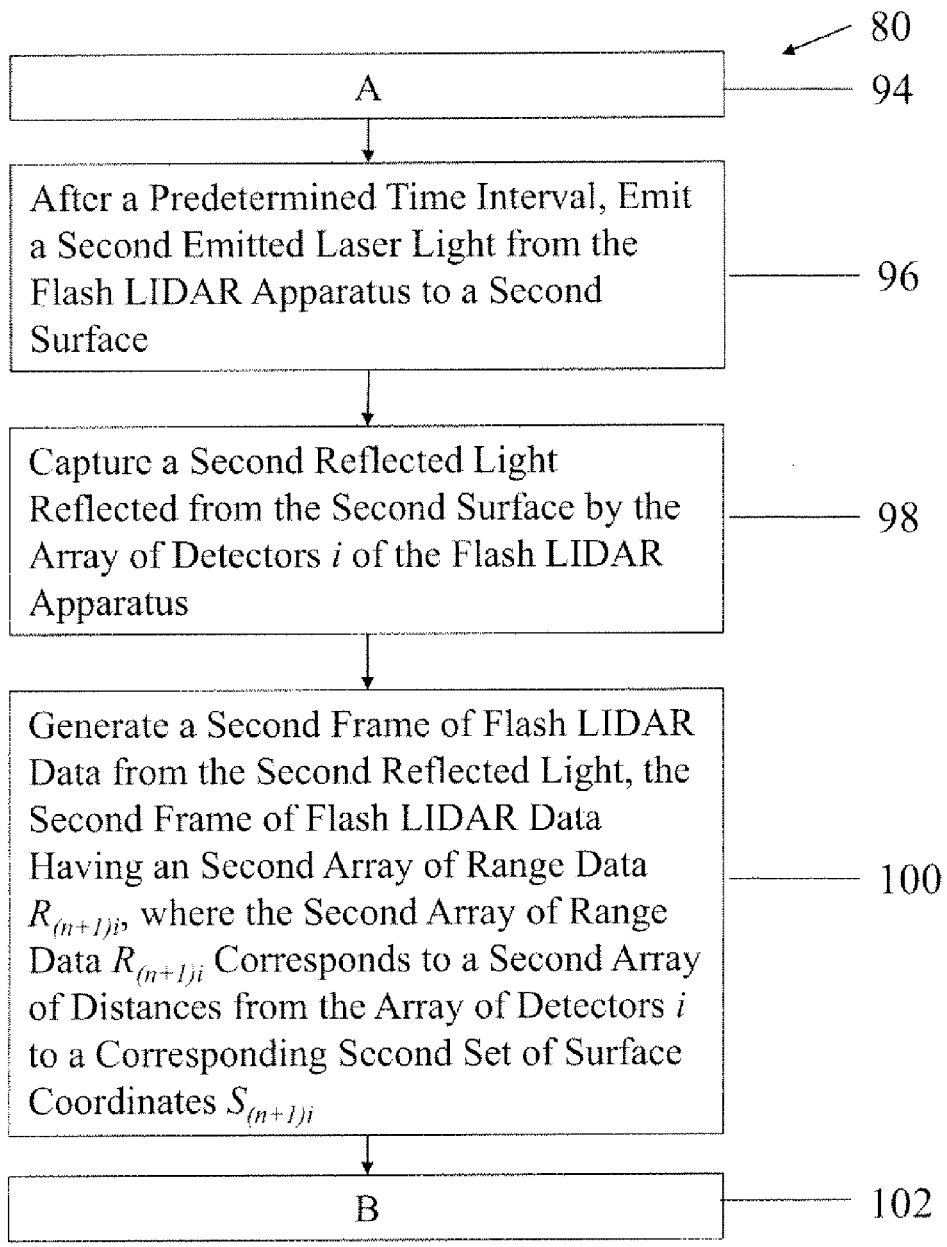

Block 94 designates a transition A from FIG. 18 to FIG. 19.

At step 96, after a predetermined time interval, a second emitted laser light is emitted from the flash LIDAR apparatus to a second surface. This is the initiation of the generation of a second frame of flash LIDAR data. At step 98, a second reflected light reflected from the second surface is captured by the array of detectors i of the flash LIDAR apparatus. At step 100, a second frame of flash LIDAR data is generated from the second reflected light, the second frame of flash LIDAR data being made up of a second array of range data $R_{(n+1)i}$.

Figure 20:
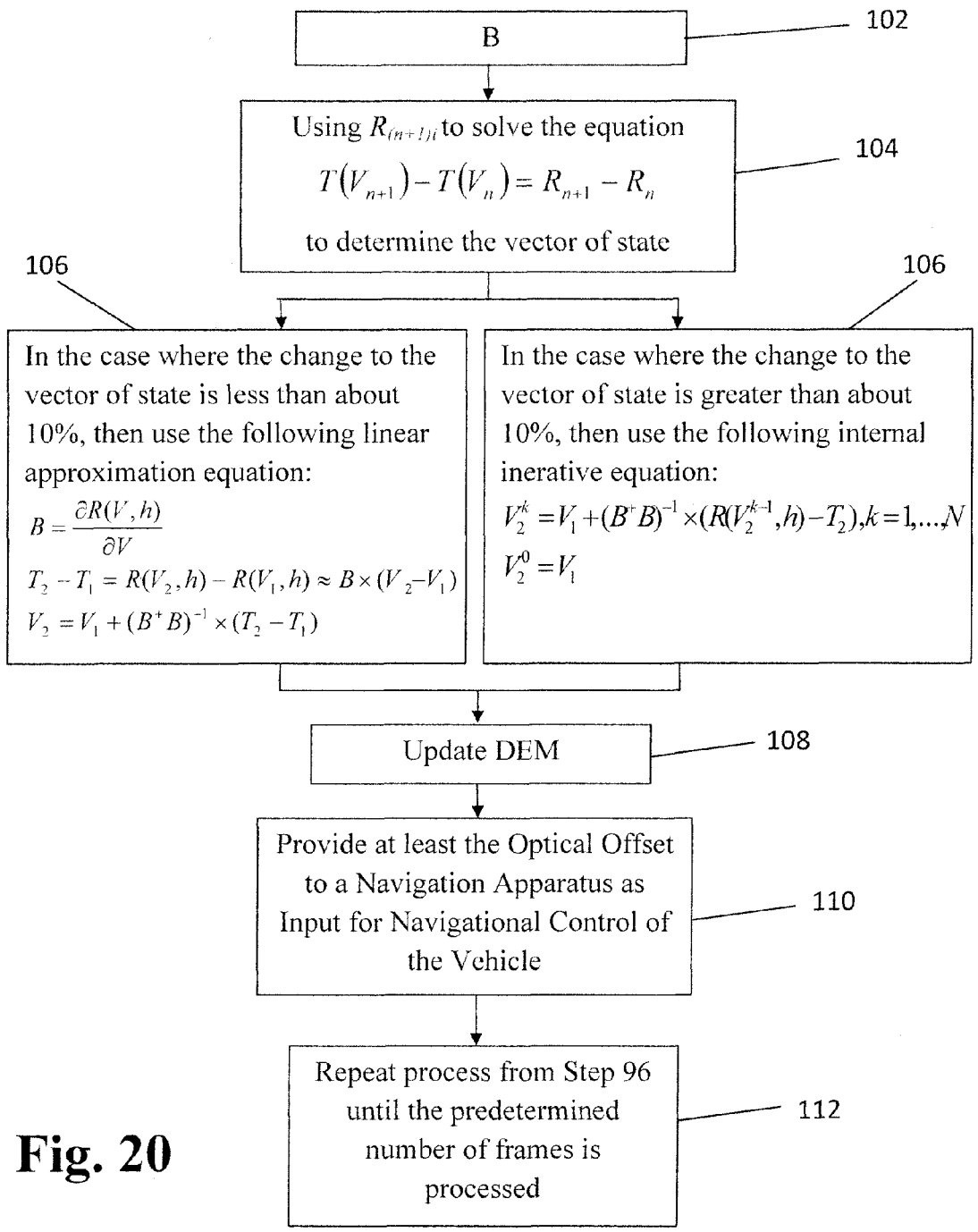

Block 102 indicates a transition B from FIG. 19 to FIG. 20.

At step 104, using the previously generated DEM, the "predicted value" of the frame may be calculated using a vector of state from the previous step. The "vector of state" as used herein is the orientation and position of the object of interest. In this case, the vector of state from the previous step is the orientation and position of the flash LIDAR apparatus. The value of the vector of state, V, can be determined by solving the following equation:

$$T(V_{n+1}) - T(V_n) = R_{n+1} - R_n \quad (7)$$

where T(V) is the theoretical model of the LIDAR frame, which is a function of the vector of state, and where R represents the matrix of the distance of a pixel in the detector to the surface. In the case where the change to the vector of state is less than about 10%, the following linear approximation equation (8) can be solved in step 106*a*:

$$B = \frac{\partial R(V, h)}{\partial V} \quad (8)$$

$$T_2 - T_1 = R(V_2, h) - R(V_1, h) \approx B \times (V_2 - V_1)$$

$$V_2 = V_1 + (B^+ B)^{-1} \times (T_2 - T_1)$$

However, in cases where the change in the vector of state is greater than about 10%, the following internal inerative equation (9) is applied instead of equation (8) in step 106*b*:

$$V_2^k = V_1 + (B^+ B)^{-1} \times (R(V_2^{k-1}, h) - T_2), k = 1, \ldots, N$$

$$V_2^0 = V_1 \quad (9)$$

At step 108, the DEM is updated using the last frame data and new vector of state data. At step 110, the optical offset, among other parameters, is provided to a navigation apparatus as input for navigational control of the vehicle. The optical offset also is referred to as an optical flow, because it identifies the change in the field of view of the detector from the first frame of LIDAR data to the second frame of LIDAR data. The output from the frame is used to construct and restore the trajectory of the DEM. The offset may be used, together with the range data to calculate variables such as change in vehicle attitude, speed, acceleration, etc. As should be apparent to those skilled in the art, the offset information may be used to generate a bevy of different types of information that may be used for the GNC processor and apparatus of a vehicle, specifically a spacecraft.

At step 112, the process can be repeated from step 96 in FIG. 19 until a predetermined number of frames is processed.

Building upon the teachings provided above, the present invention also encompasses a method of real time image processing and enhancement that is largely independent of any particular methodology employed to develop a DEM.

As should be apparent from the foregoing, the method 30 is directed to one contemplated embodiment of a super resolution algorithm that was found to be effective in generating a DEM of sufficient quality. It is recognized, however, that any algorithm mat be employed without departing from the scope of the present invention.

Figure 21:
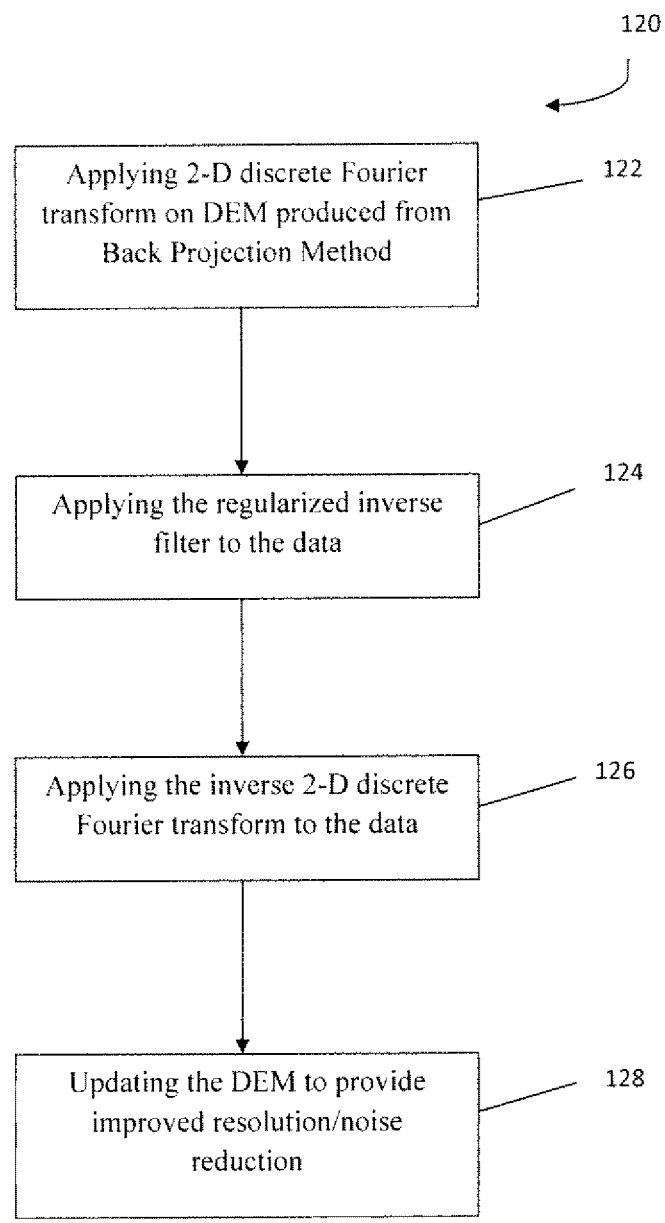
FIG. 21 provides a flow chart for a method of enhancing the image or reducing noise of the elevation map produced with the back projection method according to the present invention.

The back-projection technique to construct the DEM provides a solution which is a convolution with a residual point spread function. This method can improve spatial resolution 2-3 times as compared to the spatial resolution of a DEM with a single frame. Further enhancement of the DEM can be obtained by following the process 120 as shown in FIG. 21, which can improve the spatial resolution 4-8 times assuming a realistic level of noise. At step 122, the 2-D discrete Fourier Transform is applied to the DEM data obtained from the back projection method. At step 124, a regularized inverse filter (deconvolution) is applied to the data obtained from step 122. One deconvolution method is disclosed in A. Neumaier, Solving Ill-Conditioned and Singular Linear Systems: A Tutorial On Regularization, SIAM Review 40 (1998), 636-666, which is incorporated herein by reference in its entirety. At step 126, the inverse 2-D discrete Fourier transform is applied to the data obtained from step 124. The method is concluded which results in a DEM with improved spatial resolution.

It is noted that the methods 30, 80, 120 of the present invention may be employed in circumstances other than those sampling terrestrial or extraterrestrial terrains. For example, the methods of the present invention may be employed to assist craft to dock with one another. In such a case, the "terrain" might be a space dock. For example. In still other applications, the method of the present invention may be employed to assist robotic arms to find specific features on a device. For example, the methods of the present invention might be employed where a robot is required to manipulate a bolt. The methods of the present invention may be employed to assist the robot to find the bolt (or "terrain") that is the object of the specific manipulation that has been programmed.

In keeping with the foregoing discussion, the term "vehicle" is intended to encompass a robot, robotic arm, or other "vehicle" that requires guidance and control vis-à-vis the methods of the present invention.

While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention as defined by the appended claims.

What is claimed as new and desired to be secured by Letters Patent of the United States is:

1. A method for enhancing a three dimensional image from a plurality of frames of flash LIDAR data, comprising:
   (1) emitting laser light from an emitter of a flash LIDAR apparatus to a surface;
   (2) capturing light reflected from the surface by a first detector i of the flash LIDAR apparatus;
   (3) generating a frame of flash LIDAR data from the captured light, the frame comprising a first distance $R_i$ measured from the first detector i to a first point on the surface $S_i$;
   (4) selecting an elevation map with a mesh $\Theta$ defining a plurality of cells k;
   (5) initializing a first array S(k), a second array M(k), and a third array D(k), wherein the first array is associated with the surface, the second array is associated with the elevation map, and the third array D(k) receives an output comprising an output elevation map for the mesh $\Theta$;
   (6) projecting the surface onto a reference surface $\Omega$ to create a projection, wherein the projection comprises a zero elevation level;
   (7) selecting a set of cells from the mesh $\Theta$ that overlaps with the projection;
   (8) calculating a second distance $R_k$ from a second point on the mesh $\Theta$ to the detector, wherein a location of the second point corresponds with a location of the first point;
   (9) calculating a height $h_{ki}$ between the first point and the second point according to the equation $h_{ki}=(R_k-R_i)\times\sin\theta_i,$ wherein $\theta_i$ is an angle between the surface and the reference surface $\Omega$;

(10) updating the first and second arrays according to the equations $S(k_1)=S(k_1)+h_{k1}$ $M(k_1)+M(k_1)+1;$

(11) after completing the updating for all detectors i in the frame of flash LIDAR data, normalizing according to the equation $D(k)=S(k)/M(k)$ for all $k$ thereby calculating the third array D(k);
   (12) repeating steps (6) through (11) for each subsequent frame of LIDAR data.

2. The method of claim 1, wherein the first point and the second point are a center points that are vertically aligned with one another.

3. The method of claim 2, further comprising the step of:
   (14) determining a vector of state for the flash LIDAR apparatus according to the following equation $T(V_{n+1})-T(V_n)=R_{n+1}-R_n$ wherein T(V) is a function of the vector of state, wherein the first detector comprises a first plurality of pixels having a plurality of first distances measured from the first plurality of pixels to a plurality of first points on the surface $S_i$, wherein $R_n$ is a matrix comprising the plurality of first distances, wherein the second detector comprises a second plurality of pixels having a plurality of second distances measured from the second plurality of pixels to a plurality of second points on the surface $S_i$, wherein $R_{n+1}$ is a matrix comprising the plurality of second distances.

4. The method of claim 3, further comprising the step of:
   (15) solving a linear approximation equation as follows:

$$B = \frac{\partial R(V, h)}{\partial V}$$
   $$T_2 - T_1 = R(V_2, h) - R(V_1, h) \approx B \times (V_2 - V_1)$$
   $$V_2 = V_1 + (B^+B)^{-1} \times (T_2 - T_1)$$

(16) updating the elevation map.

5. The method of claim 4, further comprising the steps of:
   (17) applying 2-D discrete Fourier transform to the elevation map;
   (18) applying regularized inverse filter to the elevation map;
   (19) applying inverse 2-D discrete Fourier transform to the elevation map;
   (20) improving the spatial resolution of the elevation map.

6. The method of claim 3, further comprising the step of
   (15) solving an internal inerative equation as follows:

$V_2^k=V_1+(B^+B)^{-1}\times(R(V_2^{k-1},h)-T_2),k=1,\ldots,N$ $V_2^0=V_1$

(16) updating the elevation map.

7. The method of claim 6, further comprising the steps of:
   (17) applying 2-D discrete Fourier transform to the elevation map;
   (18) applying regularized inverse filter to the elevation map;
   (19) applying inverse 2-D discrete Fourier transform to the elevation map;
   (20) improving the spatial resolution of the elevation map.

8. The method of claim 1, wherein the first distance $R_i$ comprises a plurality of distances, and the second distance $R_k$ comprises a plurality of distances.

9. The method of claim 1, wherein the first array S(k), the second array M(k), and the third array D(k) are initialized by zeroing the values therein.

10. The method of claim 1, wherein the plurality of cells k define an array of A×B pixels.

11. The method of claim 10, wherein the array is a square array, with A=B.

12. The method of claim 10, wherein the array is a rectangular array, with A>B.

13. The method of claim 1, wherein the range $R_i$ is calculated according the equation $$R_i = 1 \bigg/ N_i \left( \sum_{k=1}^{k=N_i} R_k \right)$$

wherein $N_i$ is a number of cells k associated with the first detector i.

14. A method for enhancing a three dimensional image from a plurality of frames of flash LIDAR data in real time, comprising:
  (1) emitting laser light from an emitter of a flash LIDAR apparatus to a surface;
  (2) capturing light reflected from the surface by a first detector i of the flash LIDAR apparatus;
  (3) generating a frame of flash LIDAR data from the captured light, the frame comprising a first distance $R_i$ measured from the first detector i to a first point on the surface $S_i$;
  (4) selecting an elevation map with a mesh Θ defining a plurality of cells k;
  (5) initializing a first array S(k), a second array M(k), and a third array D(k), wherein the first array is associated with the surface, the second array is associated with the elevation map, and the third array D(k) receives an output comprising an output elevation map for the mesh Θ;
  (6) projecting the surface onto a reference surface Ω to create a projection;
  (7) selecting a set of cells from the mesh Θ that overlaps with the projection;
  (8) calculating a second distance $R_k$ from a second point on the mesh Θ to the detector, wherein a location of the second point corresponds with a location of the first point;
  (9) calculating a height $h_{ki}$ between the first point and the second point according to the equation $$h_{ki}=(R_k-R_i)\times\sin\theta_i,$$

wherein $\theta_i$ is an angle between the surface and the reference surface Ω;
  (10) updating the first and second arrays according to the equations $$S(k_1)=S(k_1)+h_{k1}$$

$$M(k_1)=M(k_1)+1;$$

(11) after completing the updating for all detectors i in the frame of flash LIDAR data, normalizing according to the equation $$D(k)=S(k)/M(k) \text{ for all } k$$

thereby calculating the third array D(k); and
  (12) repeating steps (6) through (11) for a frame of LIDAR data.

15. The method of claim 14, further comprising the steps of
  (13) providing an avionic device, wherein the third array D(k) is provided as input to the avionic device to provide guidance, navigation, and control.

16. The method of claim 15, wherein the avionic device comprises a Kalman filter.

17. The method of claim 16, wherein steps 1 through 12 are repeated 30 times within 1 second.

18. The method of claim 17, wherein the three dimensional image is image is enhanced such that a four centimeter object can be detected from one kilometer distance with a flash LIDAR.

19. A method for enhancing a three dimensional image from a plurality of frames of flash LIDAR data, comprising:
  (1) emitting laser light from an emitter of a flash LIDAR apparatus to a surface;
  (2) capturing light reflected from the surface by a first detector i of the flash LIDAR apparatus;
  (3) generating a frame of flash LIDAR data from the captured light, the frame comprising a first distance $R_i$ measured from the first detector i to a first point on the surface $S_i$;
  (4) selecting an elevation map with a mesh Θ defining a plurality of cells k;
  (5) initializing a first array S(k), a second array M(k), and a third array D(k), wherein the first array is associated with the surface, the second array is associated with the elevation map, and the third array D(k) receives an output comprising an output elevation map for the mesh Θ;
  (6) projecting the surface onto a reference surface Ω to create a projection;
  (7) selecting a set of cells from the mesh Θ that overlaps with the projection;
  (8) calculating a second distance $R_k$ from a second point on the mesh Θ to the detector, wherein a location of the second point corresponds with a location of the first point;
  (9) calculating a height $k_{ki}$ between the first point and the second point according to the equation $$h_{ki}=(R_k-R_i)\times\sin\theta_i,$$

wherein $\theta_i$ is an angle between the surface and the reference surface Ω, wherein the range $R_i$ is calculated according the equation $$R_i = 1 \bigg/ N_i \left( \sum_{k=1}^{k=N_i} R_k \right)$$

wherein $N_i$ is a number of cells k associated with the first detector i;
  (10) updating the first and second arrays according to the equations $$S(k_1)=S(k_1)h_{k1}$$

$$M(k_1)=M(k_1)+1;$$

(11) after completing the updating for all detectors 1 in the frame of flash LIDAR data, normalizing according to the equation $$D(k)=S(k)/M(k) \text{ for all } k$$

thereby calculating the third array D(k);
  repeating steps (6) through (11) for each subsequent frame of LIDAR data.

20. A vehicle that operates according to the method of claim 19, and wherein the third array D(k) is provided as input to a guidance, navigation, and control processor for navigation of the vehicle.

* * * * *